US007110048B2

(12) United States Patent
Weiss

(10) Patent No.: US 7,110,048 B2
(45) Date of Patent: Sep. 19, 2006

(54) DIGITAL SIGNAL TRANSMITTER SYNCHRONIZATION SYSTEM

(76) Inventor: S. Merrill Weiss, 25 Mulberry La., Edison, NJ (US) 08820-2908

( * ) Notice: Subject to any disclaimer, the term of this patent is extended or adjusted under 35 U.S.C. 154(b) by 639 days.

(21) Appl. No.: 10/112,911

(22) Filed: Mar. 29, 2002

(65) Prior Publication Data

US 2002/0140867 A1    Oct. 3, 2002

Related U.S. Application Data

(60) Provisional application No. 60/280,364, filed on Mar. 30, 2001.

(51) Int. Cl.
*H04N 7/12* (2006.01)
(52) U.S. Cl. .................................... 348/723
(58) Field of Classification Search ................ 348/723, 348/487, 608, 473.21, 724, 722, 705; 725/62
See application file for complete search history.

(56) References Cited

U.S. PATENT DOCUMENTS

| | | | |
|---|---|---|---|
| 5,087,975 A | | 2/1992 | Citta et al. |
| 5,111,287 A | * | 5/1992 | Citta et al. .................. 348/487 |
| 5,134,633 A | | 7/1992 | Werner |
| 5,267,021 A | * | 11/1993 | Ramchandran et al. ..... 348/469 |
| 5,508,752 A | * | 4/1996 | Kim et al. ................... 348/608 |
| 5,513,215 A | | 4/1996 | Marchetto et al. |
| 5,559,808 A | | 9/1996 | Kostreski et al. |
| 5,583,889 A | * | 12/1996 | Citta et al. .................. 375/341 |
| 5,629,958 A | | 5/1997 | Willming |
| 5,651,010 A | | 7/1997 | Kostreski et al. |
| 5,729,825 A | * | 3/1998 | Kostreski et al. ............. 725/62 |
| 5,760,820 A | * | 6/1998 | Eda et al. ..................... 725/33 |
| 5,808,671 A | * | 9/1998 | Maycock et al. ........... 348/180 |
| 5,822,324 A | | 10/1998 | Kostresti et al. |
| 5,912,927 A | * | 6/1999 | Smith et al. ................. 375/299 |
| 5,999,569 A | * | 12/1999 | Oshima ....................... 375/265 |
| 6,005,605 A | * | 12/1999 | Kostreski et al. ............. 348/21 |
| 6,130,898 A | | 10/2000 | Kostreski et al. |
| 6,438,359 B1 | * | 8/2002 | Bossard et al. ............. 455/103 |
| 2002/0097336 A1 | * | 7/2002 | Oshima ....................... 348/487 |

OTHER PUBLICATIONS

ETSI Technical Report TR 101 190, verison 1.1.1, issued Dec. 1997 "Digital Video Broadcasting (DVB): Implementation Guidelines for DVB Terrestrial Services; Transmission Aspects".
ZETS Technical Specification:TS 101 191, version 1.1.1, is issued Apr. 1997, Digital Video Broadcasting (DVB): DVB Mega-Frame for Single Frequency Network (SFN) Synchronziation.

* cited by examiner

*Primary Examiner*—Paulos M. Natnael
(74) *Attorney, Agent, or Firm*—Milde & Hoffberg, LLP

(57) ABSTRACT

Methods, and apparatus for carrying out the methods, are disclosed for synchronizing a plurality of RF transmitters that are supplied with a common digital information signal for carrier modulation and subsequent transmission on a common channel throughout a prescribed region, whereby the digital signal receivers within the region may receive transmissions on the channel from more than one transmitter. The method involves inserting reference signals into the data sent to the transmitters in order to place them into known states at specific times relative to the digital signals sent to them for transmission. As a result of this method, the digital signals transmitted by each of the transmitters will be identical to one another so that the receivers will be able to identify one received signal as the main signal and the others as echoes. If necessary, the signal transmitted by at least one of the synchronized transmitters may be delayed, such that identical digital signals received from at least two of the transmitters by receivers in the region will arrive at each receiver within a prescribed time window. The methods and apparatus also can be applied to one or a plurality of RF transmitters for purposes of synchronizing processes at the source of the signals and at the transmitters.

43 Claims, 22 Drawing Sheets

DIGITAL SIGNAL TRANSMITTER SYNCHRONIZATION SYSTEM

This Application claims the benefit of Provisional Application No. 60/280,364, filed Mar. 30, 2001.

BACKGROUND OF THE INVENTION

The present invention relates to methods, systems and apparatus for synchronizing digital signals, such as digital television (DTV) signals and other broadcast data signals, that are transmitted from a plurality of separated transmitting stations. It also allows the synchronization of the signal processing for transmission between a data source location and one or more transmitting locations.

When television or other transmitted signals cannot reach certain locations because of terrain blockage or because interference considerations require a lower than desirable transmitted power in a given direction, it is possible to fill in the signal at such locations through the use of additional transmitters called "boosters" or "gap fillers." This approach is well known in the art. It is also possible to extend coverage and to achieve more uniform signal levels throughout a service area using "distributed transmission," which serves similar purposes. Either approach results in a "single frequency network" of transmitters sharing the same channel. The term "booster" will be used herein to describe all such transmitters sharing a single channel.

When installing booster transmitters, advantage of the terrain often can be taken to keep the signals from the various transmitters isolated from one another to the fullest possible extent. Booster locations, antenna patterns and orientation, and power levels may be selected to maximize isolation of the signals and to place areas of overlap (i.e., areas of low carrier/interference (C/I) ratios, or high "internal" interference) where populations are minimal. Such measures are often inadequate, however, to avoid internal interference within the system.

When boosters are applied to analog signal coverage, including that of television signals, terrain blockage must be nearly complete since reception of signals from more than one transmitter will result in the appearance of echoes in the received signal, or ghosts in the received image. When digital signals are transmitted using boosters, the multiple signals arriving at a receiver still appear as a main signal and one or more echoes. In a digital receiver, however, it is possible to use adaptive equalizers, or other methods known in the art, to suppress the impact of the apparent echoes caused by the additional transmitters so as to permit extraction of the data despite the echoes. In some digital systems, moreover, it may be desirable intentionally to cause signal overlap since the receivers may be capable of combining the signal powers from several received signals, thereby recovering the signal at power levels below those that could be obtained from a single transmitter.

A necessary condition for making the signals from certain booster transmitters appear to receivers as echoes is that the signals transmitted from each transmitter used must be identical to those from the other transmitters in the network. In other words, in digital transmission, every sequence of bits on the input to the transmitters must produce an identical series of symbols for transmission from each transmitter output. This result can be achieved in one of two ways:

(1) A single modulator can be used and the modulated signal can be fed to each transmitter for relay; or
(2) A separate modulator can be used for each transmitter.

For a number of reasons, the use of a separate modulator at each transmitter will deliver higher performance from the system than would the relaying of signals from a single modulator. To create the effect of a transmitted main digital signal plus echoes, however, all of the modulators would have to be synchronized; that is, they would have to produce identical outputs from a given signal input.

A problem is that digital modulators often employ a number of processes that randomize the data that is fed to them. This randomization is done to enhance the transmission properties of the system. In some such systems, there currently is no way to cause all such modulators to adopt the same states at the same time. This is a necessary precondition for synchronizing transmitters when each has its own modulator.

In digital radio transmission and digital television systems using a single channel and the COFDM modulation technique, as are standard in certain regions of the world such as Japan and Europe, a special signal can be transmitted with the payload data to all modulators in the system to reset a number of circuit elements within the modulators to certain known states. This is possible because the data processing used is repetitive, passing through known states at particular times. The U.S. Federal Communications Commission (FCC), however, has adopted, for digital television in the United States, an 8-level vestigial sideband (8-VSB) modulation scheme with trellis coding (8T-VSB), documented by the Advanced Television Systems Committee (ATSC). The trellis coding method uses, in the coding process, memory that carries information across data structure boundaries, making it random relative to that data structure. The U.S. VSB system therefore has not been considered amenable to the processes used in single frequency networks, and modulators are not reset with this scheme. Similar characteristics exist in other modulation schemes wherein part of the data and/or signal processing carries information across data structure boundaries or in other ways has unsynchronized or non-repetitive processes.

Similarly, it may be desirable, in a system using signals having processes unsynchronized from the data structure, to separate some of the data or signal processing functions that normally take place in a modulator from other such functions, for example, at a source location and at one or more transmission locations. Yet it may be necessary to process the data at the source location in a way that requires knowledge of the states of some or all of the unsynchronized processing functions at the transmission location or locations. This might be useful, for example, to permit preprocessing of some or all of the signals to enhance their robustness or to permit combining of multiple signals at the source location in a way that takes advantage of some of the processing functions that normally would be performed at the transmission location or locations. Such separated processing would not normally be possible because of the unsynchronized processes usually performed at the transmission location or locations.

OBJECTIVES OF THE INVENTION

A primary objective of the present invention, therefore, is to provide a way to synchronize transmitters of digital signals to allow receivers, including television receivers, to treat signals received from multiple transmitters as a main signal and echoes. Once transmitters are synchronized, it becomes possible to adjust the timing of the signals emanating from those transmitters so as to minimize the burden placed on adaptive equalizers in receivers in areas with low system-internal C/I ratios.

Adaptive equalizers correct for the channel distortions caused by multipath propagation. They determine the characteristics of the channel and apply a filter adjusted automatically to have characteristics inverse to those of the channel. They operate when the echoes to be processed are in a range between the level of the primary signal received (0 dB) and a level somewhat lower than the noise power in the channel at which the receiver will just operate (the Gaussian noise threshold). In addition, adaptive equalizers operate over a limited time range by which the echoes can be displaced from the main signal. The particular design of an equalizer and certain characteristics of the signal determine that time range. In the design of single frequency networks, conditions are created that allow adaptive equalizers to treat the signals from alternate transmitters just as echoes are treated.

The low system-internal C/I ratios of concern are those having values that place the signals from alternate transmitters within the operating range of receiver adaptive equalizers. When the system-internal C/I ratio places echoes sufficiently lower in power level than the primary signal received, the alternate, lower level signals act like additional noise in the channel. When the C/I ratio falls, putting the alternate signals within the operating range of the receiver's adaptive equalizer, however, destructive interference will result unless the adaptive equalizer can separate the main and echo signals. Where C/I ratios fall below what particular receivers can handle in their adaptive equalizers, moderately directional antennas may provide sufficient amplitude separation to allow the adaptive equalizers to work. Once in the adaptive equalizer's operating amplitude range, the main and alternate signals must fall within the time window of the adaptive equalizer, or, again, destructive interference will result.

By way of example, for the 8T-VSB system used for digital television transmission in the U.S., the Gaussian noise threshold (C/N ratio) of the system is approximately 15 dB. Adaptive equalizers in digital television receivers correct the reception of signals when echoes are in the range between 0 dB and 15–20 dB below the level of the received signal. (Older receiver designs operate only to within several dB below 0 dB. As of the time of this writing, new receiver designs are beginning to approach 0 dB. Future designs are expected to achieve 0-dB performance.) When the echoes are more than about 20 dB below the level of the received signal, they behave like noise to the receiver and are not corrected by the adaptive equalizer. The time range of echoes corrected by adaptive equalizers in current receiver designs can be up to 10 microseconds leading and 40 microseconds lagging the main signal. New designs are pushing those values to greater lengths of time, both leading and lagging. Longer time windows in receiver adaptive equalizers will make the design of single frequency networks more flexible.

In order to synchronize the transmitters and to permit the adjustment of their timing, a number of requirements must be met. To minimize the demands placed on adaptive equalizers, especially considering their short delay ranges and high amplitude differentiation requirements in some early receivers, it is necessary to time-adjust the signals from transmitters. The design objective is that the signals arrive in areas of low C/I ratios at times close enough to one another to fall within the adaptive equalizers' time windows.

Further, as explained above, it is necessary to have the transmitters emit identical signals for identical inputs. Because of various methods applied to improve system performance, many digital modulation schemes, including the 8T-VSB system, inherently produce random signals for given inputs, thereby stifling application of the system synchronization and timing principals discussed previously. A more particular object of the present invention, therefore, is to provide a method and apparatus to overcome the randomness of such modulation system outputs, including those of 8T-VSB systems, allowing synchronization without eliminating the advantages produced by the systems' features.

As an example, the 8T-VSB system processes input signals through a data randomizer, a Reed Solomon forward error correction encoder, a convolutional byte interleaver, a symbol interleaver, a co-channel interference pre-coder, a trellis encoder, and a data mapper. Although several of these processes are synchronized with one another, they are applied randomly with respect to the input signal. Moreover, the trellis coding process is completely random with respect to the other processes. In order to allow identical outputs to be produced from identical inputs, means must be provided to synchronize all of the listed processes with one another not only within a given transmitter but also between transmitters. Once this is done, then the timing of transmitters with respect to one another can be accomplished using adjustable delays in the signals fed to the respective transmitters or within the transmitter signal processing systems themselves.

In addition to the synchronization of the symbols produced by multiple transmitters as a result of identical input data streams, it is also necessary that the frequencies of the several transmitters in a single frequency network be nearly identical. Any frequency differences will appear to receivers receiving such unlocked signals as Doppler shift of the echoes. Frequency locking of transmitters is well known in the art and will not be described further herein.

Yet a further object of the present invention is to allow the synchronization of data and/or signal processing between that done at the source of the data signals to be transmitted and the processing done at the transmitter location. These locations may be separated by many miles and an intervening transport system, by a few rooms within a building and an intervening cable, or by a few inches within a piece of equipment and an intervening set of internal connections. The techniques described herein, however, permit synchronization of both sets of processes, whether involving one or several transmitters.

SUMMARY OF THE INVENTION

The objectives discussed above, as well as further objectives that will become apparent from the discussion that follows, are achieved in accordance with the present invention by providing methods, systems and apparatus for synchronizing one or multiple transmitters. The synchronization is achieved either by slaving the transmitters to a replica of the signal to be transmitted, by separating the transmitter data processing from the signal processing functions, or by inserting reference signals into the data sent to the transmitters in order to place them into known states at specific times relative to the signals sent to them for transmission.

More specifically, the present invention provides methods, and systems and apparatus for carrying out the methods, for synchronizing a plurality of digital (e.g., DTV) transmitters that are supplied a common data signal for modulation, including eight-level vestigial sideband (8-VSB) modulation, and for subsequent transmission on a common channel throughout a prescribed region, whereby the receivers within the region may receive identical transmissions on the common channel from more than one transmitter. Furthermore, the same methods, systems and apparatus of the current invention may also be applied to systems involving a single transmitter or a plurality of transmitters in which it is advantageous to synchronize processes carried out at the source of the signals with processes carried out as part of the transmission operation.

Specifically, as regards a digital television (DTV) signal used only for the sake of example, the method in one of its embodiments comprises the steps of:

generating a data signal comprising audio data, video data, control data, ancillary data, and/or any other form of data;
  processing the data signal in the same way as would be done in the data processing portion of the normal channel coding of a transmitter;
  modulating that data signal onto a carrier at an intermediate frequency;
  transporting the modulated data signal to one or a plurality of transmitters, each transmitter having 8-VSB channel coding, modulation and power amplification;
  demodulating the data signal from the delivered carrier frequency;
  processing the data signal to obtain the data to be transmitted and the reference data necessary to synchronize the processing in the transmitter;
  setting the channel coding of each transmitter at specific times into the same known states relative to the data signal in response to reception of the reference data;
  channel coding and modulating the data signal at each transmitter after the channel coding states have been set, thereby producing a modulated radio frequency (RF) signal carrying the data signal;
  amplifying the modualted RF signal carrying the data signal at each transmitter; and
  transmitting the resultant amplified modulated RF signal carrying the data signal at each transmitter.

Another embodiment of the method, as applied to a digital television (DTV) signal used only for the sake of example, comprises the steps of:

generating a data signal comprising audio data, video data, control data, ancillary data, and/or any other form of data;
  processing the data signal in the same way as would be done by the normal data processing portion of a transmitter;
  transporting the data-processed data signal to one or a plurality of transmitters, each transmitter having 8-VSB signal processing, modulation and power amplification;
  signal processing and modulating the data-processed data signal at each transmitter, thereby producing a modulated radio frequency (RF) signal carrying the data signal;
  amplifying the modulated RF signal carrying the data signal at each transmitter; and
  transmitting the resultant amplified modulated RF signal carrying the data signal at each transmitter.

Yet another embodiment of the method, as applied to a digital television (DTV) signal used only for the sake of example, comprises the steps of:

generating a data signal comprising audio data, video data, control data, ancillary data, and/or any other form of data;
  processing the data signal in the same way as would be done in the data processing portion of the normal channel coding of a transmitter;
  extracting from the processed data signal reference data to be used in synchronizing one or a plurality of transmitters;
  inserting the reference data into the data signal;
  transporting the data signal with the reference data to one or a plurality of transmitters, each transmitter having 8-VSB channel coding, modulation and power amplification;
  setting the channel coding of each transmitter at specific times into the same known states relative to the data signal in response to reception of the reference data;
  channel coding and modulating the data signal at each transmitter after the channel coding states have been set, thereby producing a modulated radio frequnecy (RF) signal carrying the data signal;
  amplifying the modulated RF signal carrying the data signal at each transmitter; and
  transmitting the resultant amplified modulated RF signal carrying the data signal at each transmitter.

As a result of these methods, the modulated RF signals carrying the data signals transmitted by all of the transmitters in a system will be substantially identical to one another, so that receivers will be able to treat one received signal as the main signal and the others as echoes.

If necessary, the signal transmitted by at least one of the synchronized transmitters may be delayed, such that the substantially identical modulated RF signals carrying the data signals received from at least two of the transmitters by receivers in a region will arrive at each receiver within a prescribed time window.

The methods described may also be used to synchronize a single transmitter or a plurality of transmitters to processes performed elsewhere in the system so as to permit additional functionality.

For a full understanding of the present invention, reference now should be made to the following detailed description of the preferred embodiments of the invention as illustrated in the accompanying drawings.

BRIEF DESCRIPTION OF THE DRAWINGS

In the figures to be described, a digital television (DTV) station is shown for purposes of example. As will be understood by one of ordinary skill in the art, other applications and other transmission techniques will similarly benefit from use of the methods shown in the figures and described below.

DESCRIPTION OF THE PREFERRED EMBODIMENTS

Figure 1:
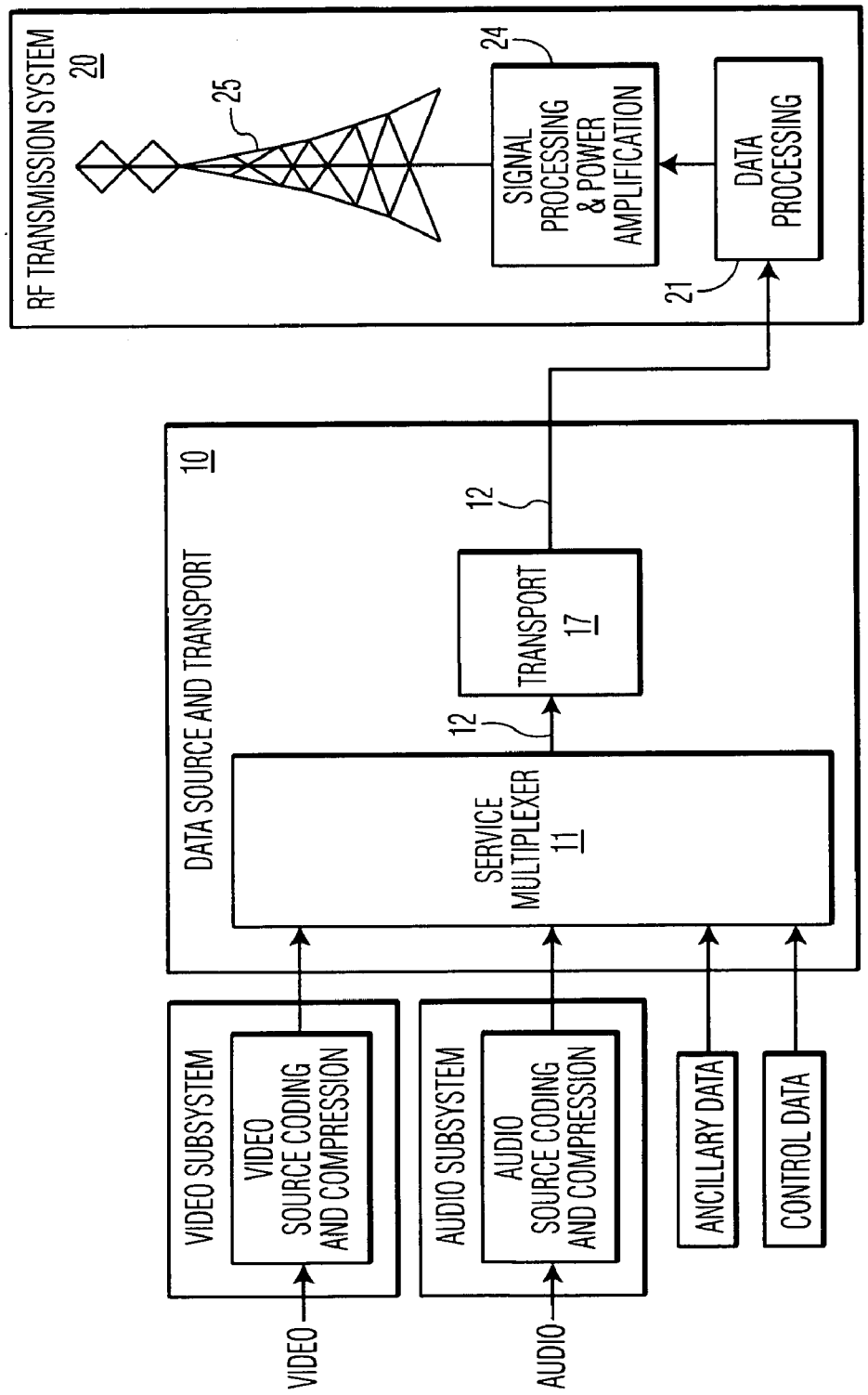
FIG. 1 is a block diagram of a standard digital television (DTV) station.

The preferred embodiments of the present invention will now be described with reference to FIGS. 1–21 of the drawings. Identical functional elements in the various figures are designated with the same reference numerals even though their precise operation may be different. The discussion to follow uses 8-VSB modulation of a digital television signal strictly for the sake of example. As will be recognized by those of ordinary skill in the art, the techniques described may be applied to a wide range of applications and types of modulation.

Overview of Synchronization Methods

The methods, systems and apparatus according to the present invention for synchronizing transmitters operate, in several embodiments, to insert reference signals into the data sent to the transmitters in order to place them into known states at specific times relative to the signals sent to them for transmission. In one embodiment, the methods, systems and apparatus according to the present invention operate to centrally process the data sent to the transmitters so that only the signal processing portions of the channel coding function remain at the transmitters. These embodiments can be seen in overview in FIGS. 1 through 5.

FIG. 1 shows the standard case before application of the invention described herein, wherein the service multiplexer 11 produces an MPEG-2 Transport Stream output 12 at the required data rate (19.392658 Mb/s for the 8T-VSB system used in this example), which is carried by the transport 17 to a single transmitter 20, which, in turn, operates independently to generate the signal for transmission. The data processing portions 21 of the channel coding systems at the transmitter lock to the packet sync words contained within the MPEG-2 Transport Stream signal 12 sent to them, producing payload data segments at the same rate as the Transport Stream packets, but those data processing portions 21 also have numerous procedures that are not time-controlled by the packet sync words.

As is well known from the ATSC Standard for Digital Television (A/53), in the 8T-VSB system, the data packets of the MPEG-2 Transport Streams are formed by the transmitter data processing subsystem into a structure of data segments, data fields, and data frames, comprising the amount of data from one payload packet, 312 payload packets and 624 payload packets, respectively. Most of the transmitter data processing functions operate synchronously with one another once the data field and frame structures have been established. Each data field is a collection of 313 data segments. 312 are payload data segments, each payload data segment carrying the amount of data from one MPEG-2 Transport Stream packet. The remaining data segment is a synchronization data segment that, in addition to synchronization information, also carries information about the structure and/or operating mode of the signal and carries several training signal sequences used by receiver adaptive equalizers to adjust their operation. Each data frame consists of two data fields. The only difference between the two data fields in a data frame is that one of the training signal sequences in the synchronizing segment is symbol-by-symbol inverted relative to the other.

In standard 8-VSB, data segment sync is locked to MPEG-2 Transport Stream packet sync words, but data field and frame sync occurs randomly with respect to everything but packet boundaries. Providing a mechanism for locking the data field sync and data frame sync will enable synchronization of all data processing functions other than the pre-coding and trellis encoding. (From this point onward, pre-coding and trellis encoding will often be treated under the simpler rubric of "trellis coding." When that term is used, both techniques are implied unless otherwise noted.) This is so because all of the data processing other than trellis coding recycles at data field and data frame boundaries. Causing each transmitter to put its data field and data frame sync signals between the same MPEG-2 Transport Stream packets as does every other transmitter thus can lock the transmitters together for everything but trellis coding.

Trellis coding (including both pre-coding for co-channel interference suppression and trellis encoding per se) uses memory to remember prior states of the encoding process and to limit states that can be taken by future transmitted symbols. In order to assure that the output symbol sequences of multiple transmitters will follow the same trajectories, it is necessary to put their trellis coders into the same states at the same time relative to the data to be transmitted. Since the trellis code states have no relationship to data segment, data field, or data frame syncs, it is necessary provide other means to force the various trellis coders into the required states at the required times. Those other means are the principal differences between the several embodiments of the invention now to be considered.

Figure 2:
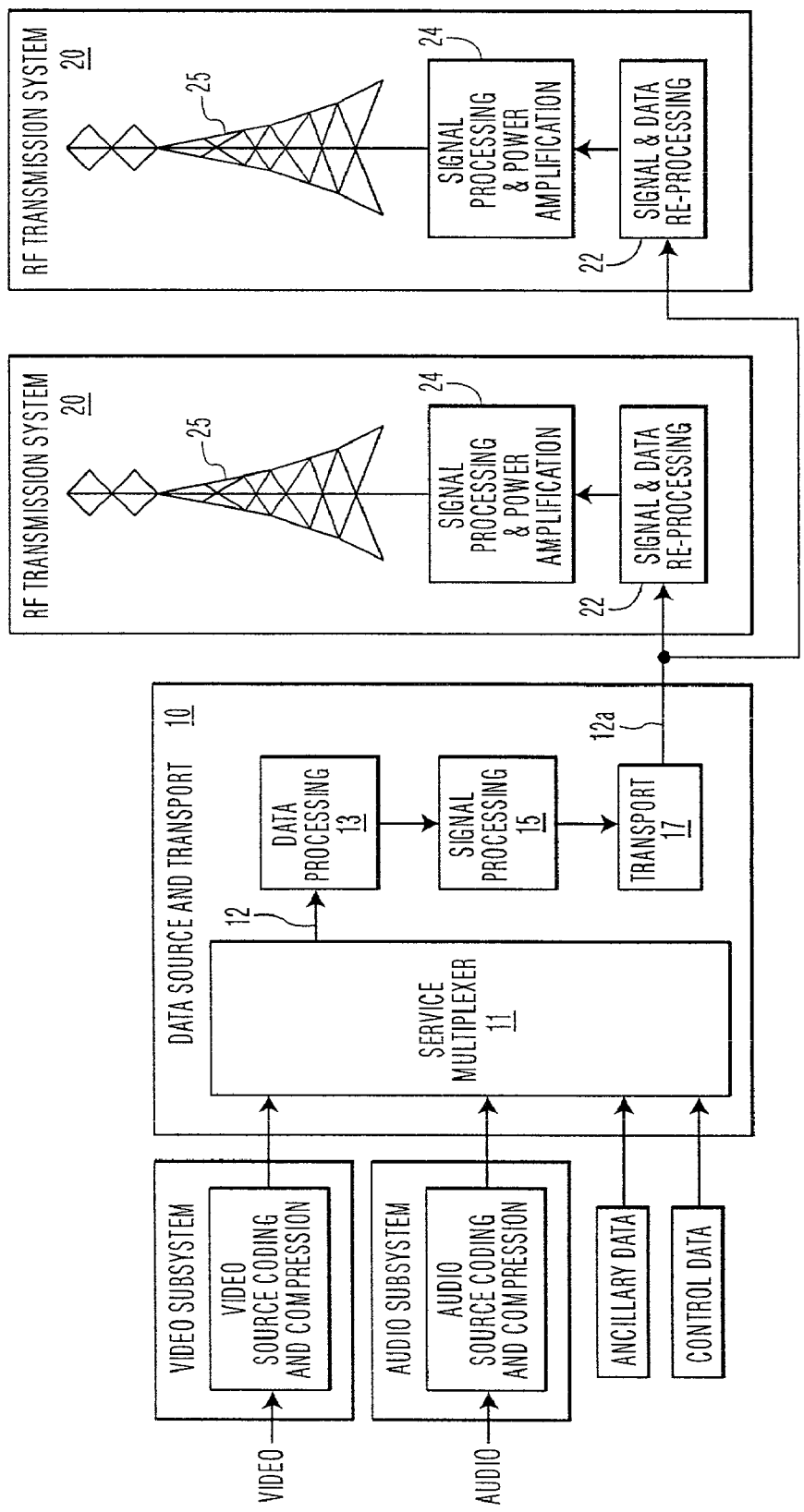
FIG. 2 is a block diagram of a DTV station with synchronized transmitters, according to a first preferred embodiment of the present invention, wherein a fully modulated signal is created at a central point and transported to the transmitters, where the signal is demodulated and remodulated for transmission.

The remodulated transmitter method of the invention is shown in overview in FIG. 2. In this method, the MPEG-2 Transport Stream data 12 to be transmitted is fully modulated into a radio frequency signal 12a at the central location by the data processing 13 and signal processing 15 functions, which are identical to those used at the transmitter 20 in the standard configuration of FIG. 1. The modulated radio frequency signal 12a is carried by the transport 17 to the multiple transmitter sites. That modulated signal is signal-processed and data-reprocessed 22 at the transmitters, and then signal processed again 24 before power amplification for transmission. The transport 17 in this case requires analog signal transmission of a radio frequency signal 12a with quality sufficiently high to allow accurate recovery of the data at the transmitters. But the channel impairments of the transport system 17 will not be reflected in the transmitter outputs 25 as in the prior art case of a centralized modulator and a fully analog transport subsystem.

Figure 3:
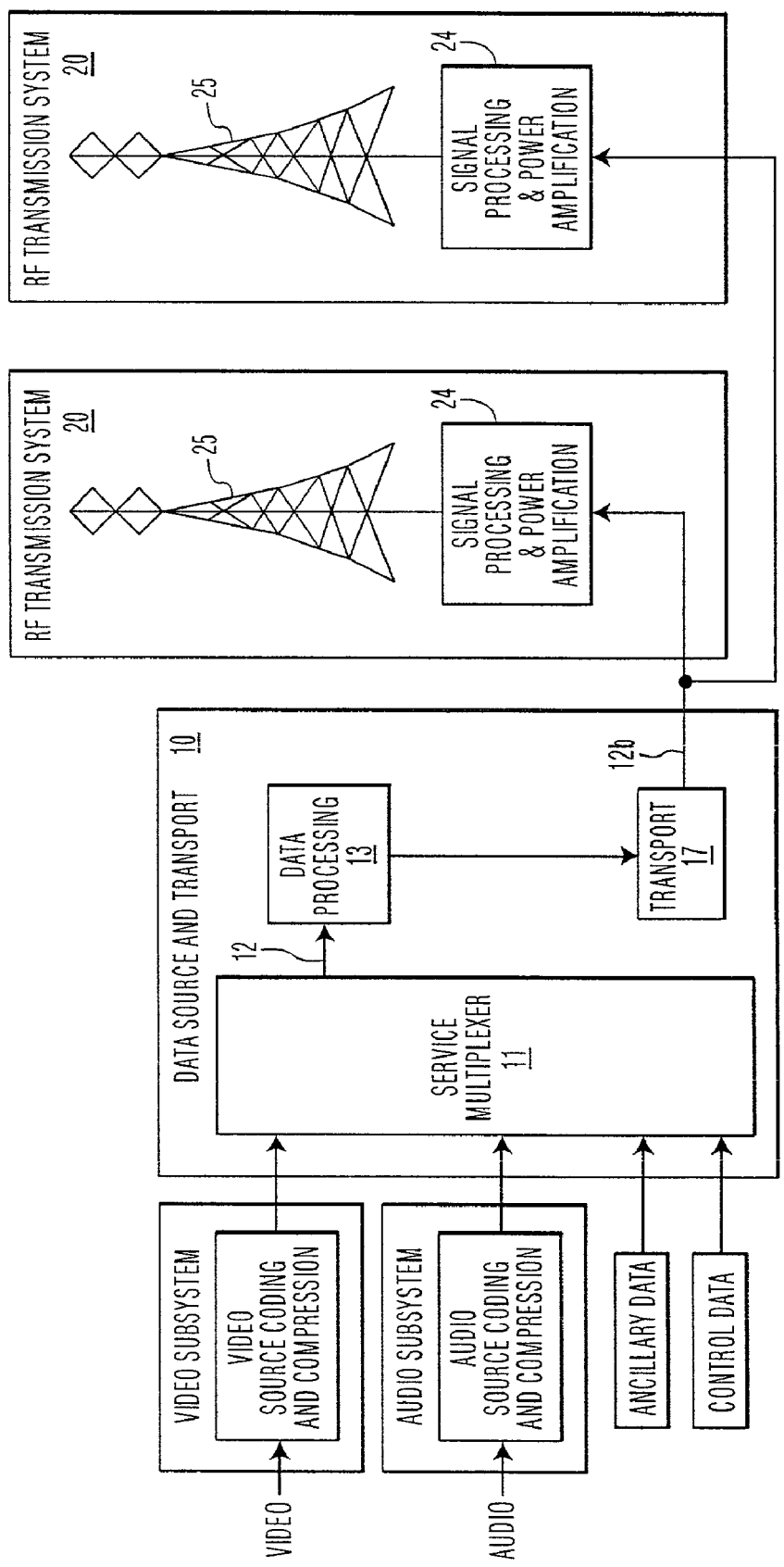
FIG. 3 is a block diagram of a DTV station with synchronized transmitters, according to a second preferred embodiment of the present invention wherein the data processing is located at a central point and the signal processing occurs at each transmitter.

FIG. 3 shows the overview of the split channel coding method. Fundamentally, this method splits apart the data processing and the signal processing portions of the channel coding subsystem that are located together at the transmitter 20 in the standard configuration of FIG. 1. In the split channel coding method, the data processing 13, which includes all of the elements of the system that determine the output symbols, is done at the central point in the system. Symbol data 12b is then carried by the transport 17 to each of the RF transmission systems 20. The signal processing, which includes the generation of the modulated signal, its upconversion to the final output channel and power amplification, all in block 24, is carried out at each of the transmitter sites. Thus there is only one data processing system and a multiplicity of signal processing systems. This method has the advantage that the transport 17 can be fully digital in operation, but it has the disadvantage that the data rate of the symbol data 12b is approximately 50 percent higher than the rate of the MPEG-2 Transport Stream data 12 that constitutes the payload.

Figure 4:
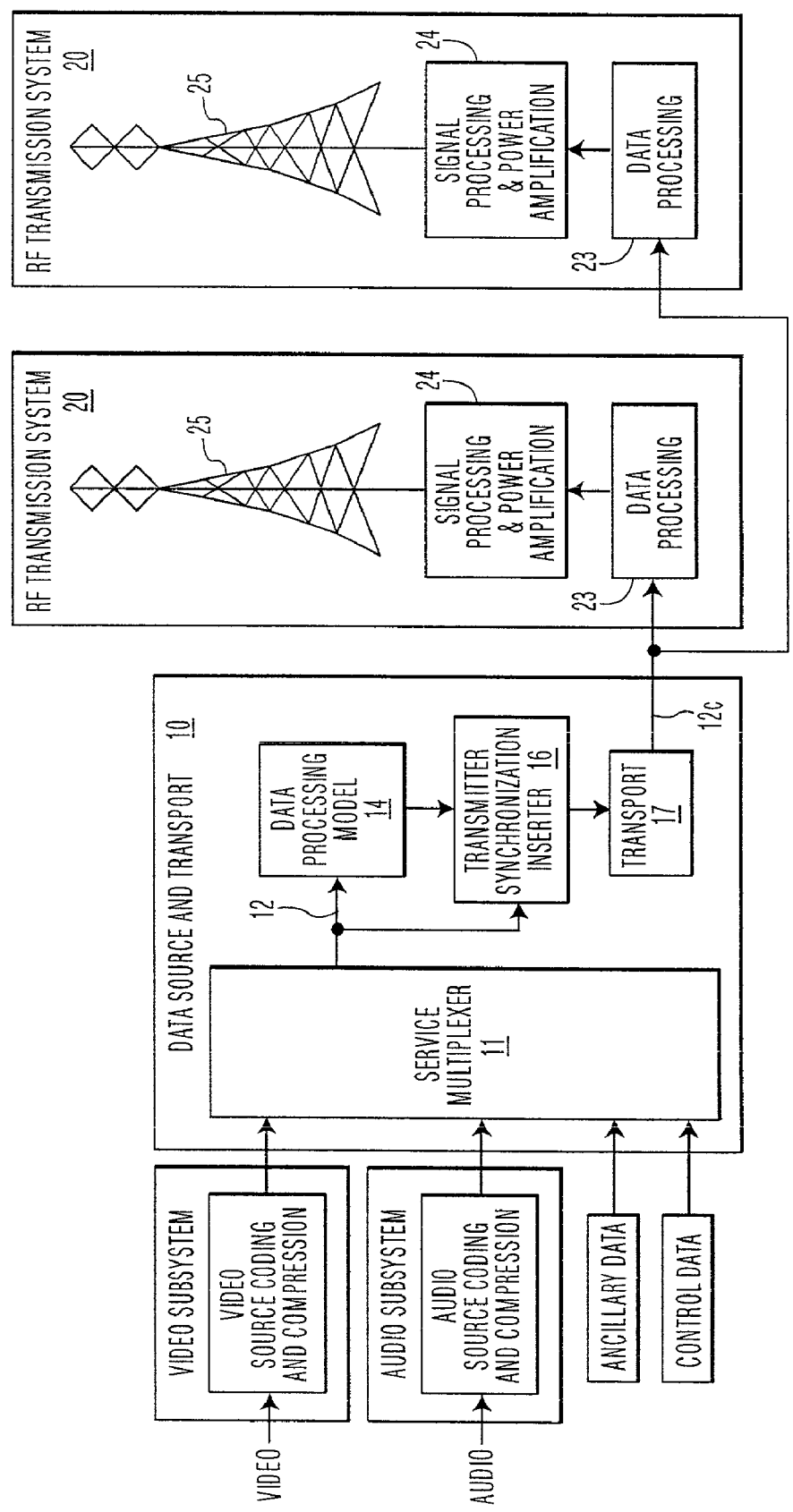
FIG. 4 is a block diagram of a DTV station with synchronized transmitters, according to a third preferred embodiment of the present invention, wherein both data processing and signal processing are collocated at each transmitter.

In order to cause multiple transmitters fed the same MPEG-2 Transport Stream 12c, as shown in the synchronized transmitter method of FIG. 4, to produce identical outputs, it is necessary to send additional information in the streams to synchronize the processes within the transmitters. This is accomplished in the system described herein by inserting in block 16 two types of synchronization information into the Transport Stream. The synchronization information is developed in a model 14 of the data processing portion of the channel coding system (FIG. 1 block 21) placed before the transport system 17 that feeds the transmitters. The synchronization information is inserted into the MPEG-2 Transport Stream in a way that minimizes the overhead required to carry the extra data while providing high reliability for that data. The result is that a fully digital transport 17 can be used and the data rate required through that transport is identical to the rate of the MPEG-2 Transport Stream data 12 that constitutes the payload.

Figure 5:
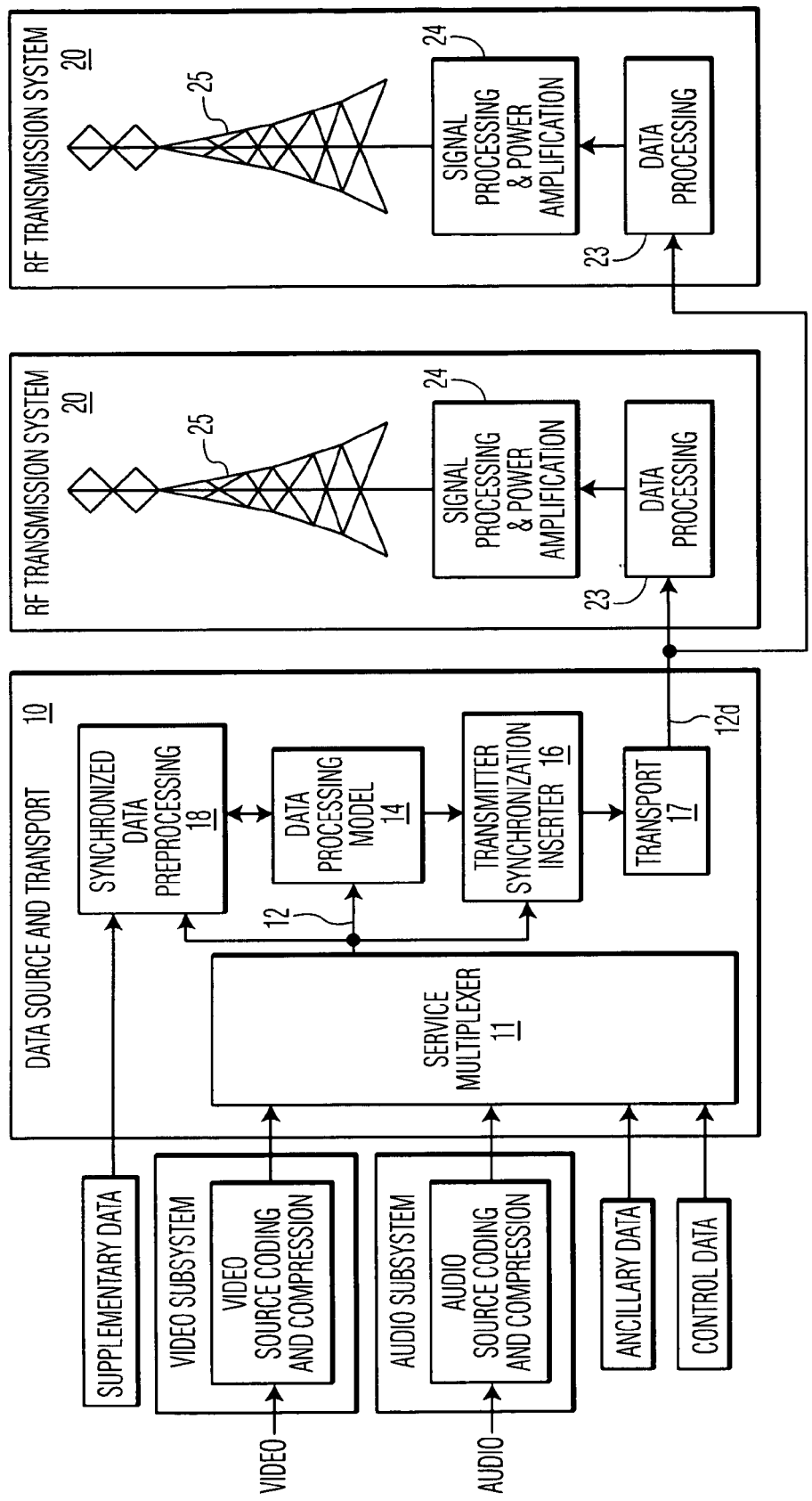
FIG. 5 is a block diagram of a DTV station with synchronized processing at the source and transmitter locations, for source processing synchronized with final random output processing.

While one major purpose of the present invention is to permit the synchronization of multiple transmitters operating in a single frequency network, another purpose is to permit the synchronization of processes at the signal source location with processes carried out at the transmitter location. This is shown in FIG. 5, wherein the synchronized transmitter method of FIG. 4 has been adapted to include synchronized data preprocessing 18. The synchronized data preprocessing 18 may serve a wide range of purposes, but requires that its functions operate synchronously with all the other functions that will be applied to the signal prior to transmission. For example, it may apply processing that takes advantage of knowledge of the trellis code states at various times. In another example, it may add data to the Transport Stream that otherwise would require a separate transport channel to the transmitter location. While the synchronized transmitter method has been used to support the example of this method, it should be apparent to those of ordinary skill in the art that the same results also can be achieved with any of the other methods of the present invention.

Before turning to a detailed examination of the methods of the present invention, it will be helpful to the later explanations to have as a baseline an example of a standard channel coding system, such as that used for 8T-VSB in the ATSC A/53 standard for digital television. Such an example is given in FIG. 6, which shows the standard 8T-VSB channel-coding scheme, including both data processing and signal processing. The signal flow in the system begins with the delivery to the transmitter of an MPEG-2 Transport Stream 12 by the Data Source and Transport 10. The main data processing functions are arrayed along the middle row in the figure. A first-in-first-out (FIFO) buffer 31 is first used to adapt the data rate to that required by the later processing blocks. The FIFO Buffer 31 is followed by a Data Randomizer 32 that applies a pseudo-random bit sequence to the data to reduce the occurrence of low frequency components in the signal spectrum. Next comes a Reed Solomon (R-S) encoder 33 that adds redundant error correction coding (ECC) data to the signal to permit forward error correction (FEC) in receivers. The Reed Solomon encoder 33 adds 20 bytes to each 188-byte MPEG-2 Transport Stream packet for a total packet length of 208 bytes. Following the R-S coding, the data processing portion of the channel coding system consists of a Convolutional Byte Interleaver 34, a Symbol Interleaver 35, a Pre-coder & Trellis Encoder 36, and a Mapper & Sync Inserter 37. The Modulator 38 constitutes the sole element of signal processing in this example.

When the MPEG-2 Transport Stream signal 12 is received from the Data Source & Transport 10, the data processing system must lock to its bit rate. This is done by the Clock Extractor 41, which drives all the data processing functionality. The Clock Extractor 41 directly drives the input clock of the FIFO Buffer 31. Following the Clock Extractor 41 are two Clock Multipliers 42 and 43 with ratios of 208/188 and 313/312 to compensate for the data rate increases caused by the R-S Encoder 33 and the Sync Inserter 37, respectively. The output clock rate from the pair of Clock Multipliers 42 and 43 drives the data processing subsystem from the FIFO Buffer 31 output onward.

Virtually all of the data processing is synchronous with the MPEG-2 Transport Stream 12 packet structure. This synchronization is established by the Packet Sync Detector 51, which examines the input data for the recurrence at appropriate intervals of the standard MPEG-2 Transport Stream packet sync word 47h (h=hexadecimal notation). Many of the data processing steps are also synchronous with the data field structure. The data field structure is established by the Divide by 312 Counter 52, which establishes a cadence for the remaining data processing elements but which operates synchronously only to the packet structure in the MPEG-2 Transport Stream. Thus, it is unpredictable between which MPEG-2 Transport Stream packets the data field synchronization data segment will be inserted and the various data processing elements simultaneously will be reset. Since the data frame synchronization segments alternate with the data field synchronization segments, merely inverting the bits in one of the pseudo-random training sequences, they are controlled by a Divide by 2 Counter 53, which causes the alternation between the two types of synchronization segments to occur.

Figure 6:
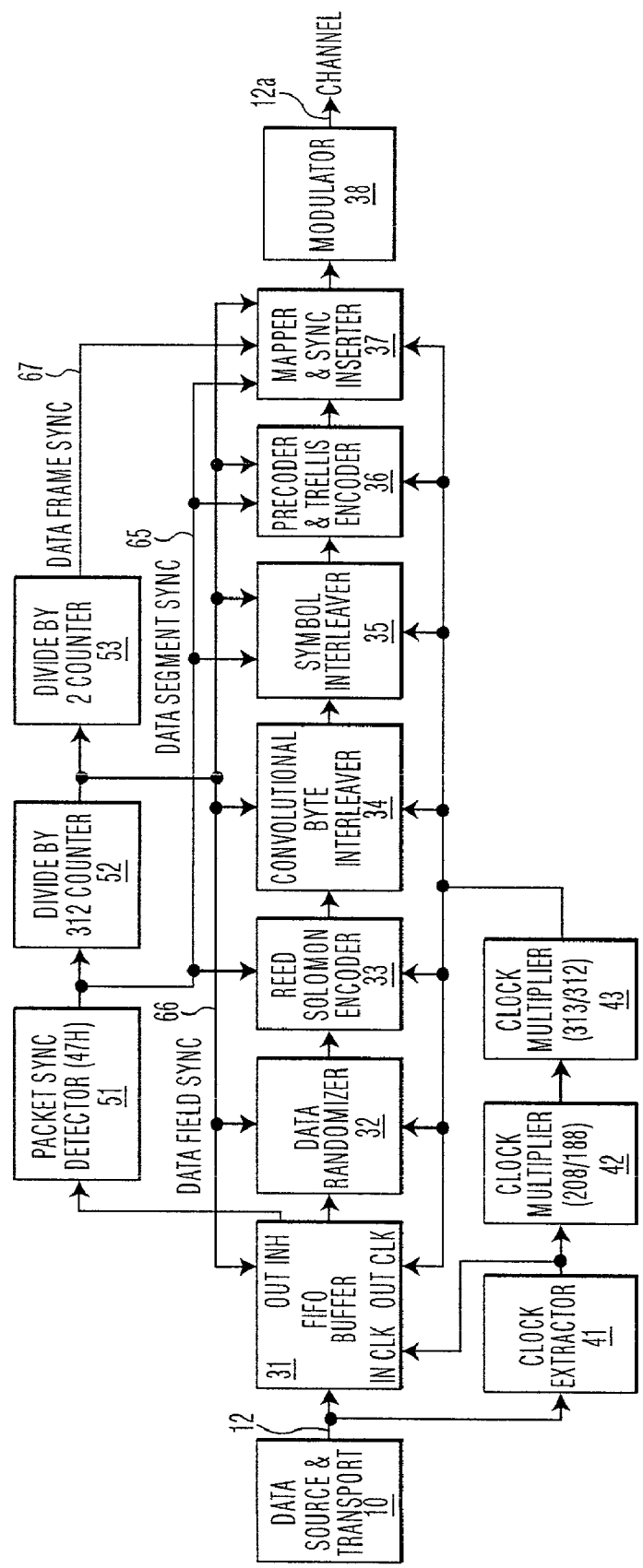
FIG. 6 is a block diagram of a standard 8-VSB channel encoder for a DTV modulator.
Figure 7:
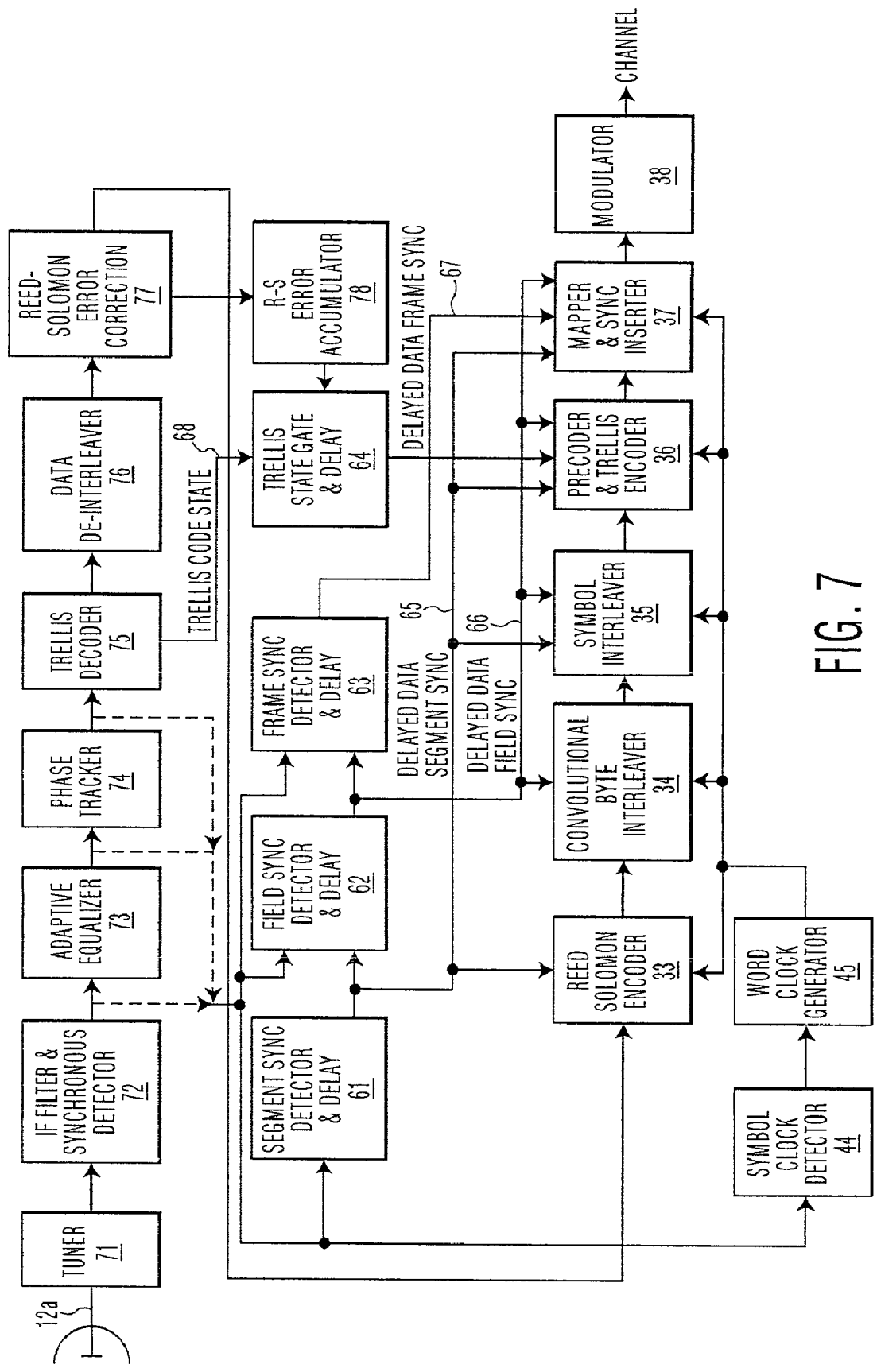
FIG. 7 is a block diagram of an 8-VSB channel encoder for the embodiment of the system shown in FIG. 2 that uses remodulation at the transmitters.

As noted previously, the functions of the Pre-coder & Trellis Encoder 36 use memory to carry information across the data structure boundaries of the data segments, data fields, and data frames. Nevertheless, there are parts of the Pre-coder & Trellis Encoder 36 functions that are synchronous with the data segment and data field structure. Thus FIG. 6 shows connections to the Pre-coder & Trellis Encoder 36 from the Data Segment Sync 65 and Data Field Sync 66 signals. It should be understood that these do not negate the random nature of the output from the Pre-coder & Trellis Encoder 36.

Remodulated Transmitter Method

As described in overview previously with respect to FIG. 2, the first method of the invention uses transmitter remodulation to provide synchronous signals from one or a plurality of transmitters. The data processing and signal processing in the Data Source and Transport block 10 of FIG. 2 are identical in operation to the standard 8-VSB channel coding shown in FIG. 6. A radio frequency signal 12a carrying the modulated MPEG-2 Transport Stream signals in 8T-VSB form is delivered to each transmitter by the Transport 17 system of FIG. 2. The basic functions to be carried out at each transmitter then become to demodulate the signal to an appropriate data representation and then to remodulate the data. If an ordinary 8T-VSB receiver were connected to an ordinary 8T-VSB modulator, the result would be the randomization of the signal by uncontrolled insertion of the data field and data frame synchronization segments and by the random starting of the trellis coder process in the modulator. Thus the benefit of synchronized operation would be lost. Consequently, it is necessary to devise a channel coding scheme for the remodulated transmitter method that retains positions of the data field and data frame synchronization segments and that restores the trellis coding to the same states for the same data inputs as were produced by the central modulator.

An example of a remodulating channel coding system is shown in FIG. 7, once again using 8T-VSB as an example. The modulated radio frequency signal 12a from the transport system is signal processed and the data recovered in the first five blocks 71–75 on the upper row of the figure, which together comprise the standard receiver signal processing for the system. Here, the Tuner 71 selects and amplifies the signal, converting it to an intermediate frequency. The IF Filter & Synchronous Detector 72 delivers a baseband signal for further signal processing. The Adaptive Equalizer 73 minimizes channel effects to enable data recovery. The Phase Tracker 74 minimizes the effects of oscillator frequency variations in different parts of the system. The Trellis Decoder 75 reverses the trellis coding done at the transmitter and in the process recovers the data that was transmitted. The recovered data are then data processed in the Data De-Interleaver 76 to the point that any transmission errors in the transport system can be corrected, here in the Reed-Solomon Error Correction element 77. At the same time, any synchronization information in the transported signals is recovered, here by the Segment Sync Detector & Delay 61, the Field Sync Detector & Delay 62, and the Frame Sync Detector & Delay 63. (Note that these blocks are shown by the dashed lines being fed alternatively from one or the other of the blocks 72–74, the choice of which will depend upon the particular circuit design.) Also recovered are data defining the states of any portions of the data processing that are not synchronized, as in the trellis coding processes used in 8T-VSB, for example, represented here by the Trellis Code State data 68.

The error-corrected data are next passed to the equivalent point in the data processing chain of the transmission system. In the example using 8T-VSB shown in FIG. 7, this is the Reed Solomon Encoder 33 shown at the left end of the third row of blocks. The remainder of the data processing and signal processing of the modulator, blocks 34–38, are the same as in a normal modulator except that their synchronization is derived from the signals received from the transport system, delayed by appropriate amounts to account for the various processing steps through the data processing subsystem. In addition, the states of any processes that cannot be synchronized, such as the Pre-coder & Trellis Encoder 36 shown for 8T-VSB for example, are set to the same states as the signals arriving from the transport system, with the appropriate delays once again. To make the setting of the non-synchronized processing states error-free, the states of the Pre-coder & Trellis Encoder 36 or their equivalents, are only set when the recovered data were error free without application of forward error correction for a sufficiently long period. This indicates that the recovered non-synchronized data, such as the trellis decoded data, were accurate without further error correction and can be used to slave the equivalent processes in the reprocessing of the data. This functionality is obtained in the example system in the Reed-Solomon Error Accumulator 78 and the Trellis State Gate & Delay 64 blocks. The methods for extracting the Trellis Code State data 68 and for setting the state of the Pre-coder & Trellis Encoder 36 are detailed in the section below on the synchronized transmitter method.

The remodulated transmitter method has the disadvantages of requiring analog transport, presumably using either microwave or terrestrial fiber interconnections. Microwave channels may not be available to all locations where it is necessary to install transmitters, depending upon the spectrum congestion in the region in which the system is located. Analog terrestrial fiber is likely not to be available from service providers in many places, since there is not a very significant demand for such analog service in relation to the overall transport services business. This leads to a preference for one of the methods that makes use of digital transport.

It should be noted that, while not explicitly shown, the preprocessing method of FIG. 5 could be applied to the remodulated transmitter method. Similarly, it is possible to adjust the timing of the transmitters using appropriate delay functions in the main signal path and the several synchronization signal paths. Instructions could be sent to the transmitters in the form of coded data to control the time at which signals are emitted. Because of the radio frequency transmission of standard MPEG-2 Transport Streams to the transmitter locations, however, there is no inherent method for such communication, and alternate means for communicating such control data must be provided.

A further extension to the remodulated transmitter method is the transmission by any or all of the transmitters of certain sequences of bits and/or the resulting symbols that differ from those transmitted by the other transmitters in the single frequency network. The differing bits and/or symbols can allow identification of individual transmitters in the network and/or the transmission by them of a proportion of the transmitted data that differs from one transmitter to another. The bits and/or symbols that are varied from one transmitter to the next in this way must be carefully chosen so as not to disturb the ability of receivers to treat the signal from one transmitter as primary and those from the other transmitters in the network as echoes or whatever other methods receivers may use to enable reception of signals in a multipath environment. As with transmitter timing information just discussed, a means must be provided for communicating to the individual transmitters the differences in the data they are to transmit, which could be anything from a fixed setting of the transmitters to a separate data communications channel carrying the data to be transmitted differently by each transmitter.

Split Channel Coding Method

The split channel coding method of the invention was described previously in overview with respect to FIG. 3. In that discussion, it was explained that the Data Processing 13 block of FIG. 3 contained all of the data processing elements of the system that determine the output symbols from the modulator. In an overall system, there is one such Data Processing subsystem 13, located in the Data Source and Transport block 10. One instance of the Signal Processing subsystem is contained within block 24 at each transmitter location. To provide a specific example of the method, the centralized data processing system for a split channel coding system using 8T-VSB is shown in detail in FIG. 8, and the signal processing system for an 8T-VSB transmitter using split channel coding is shown in FIG. 9.

Figure 8:
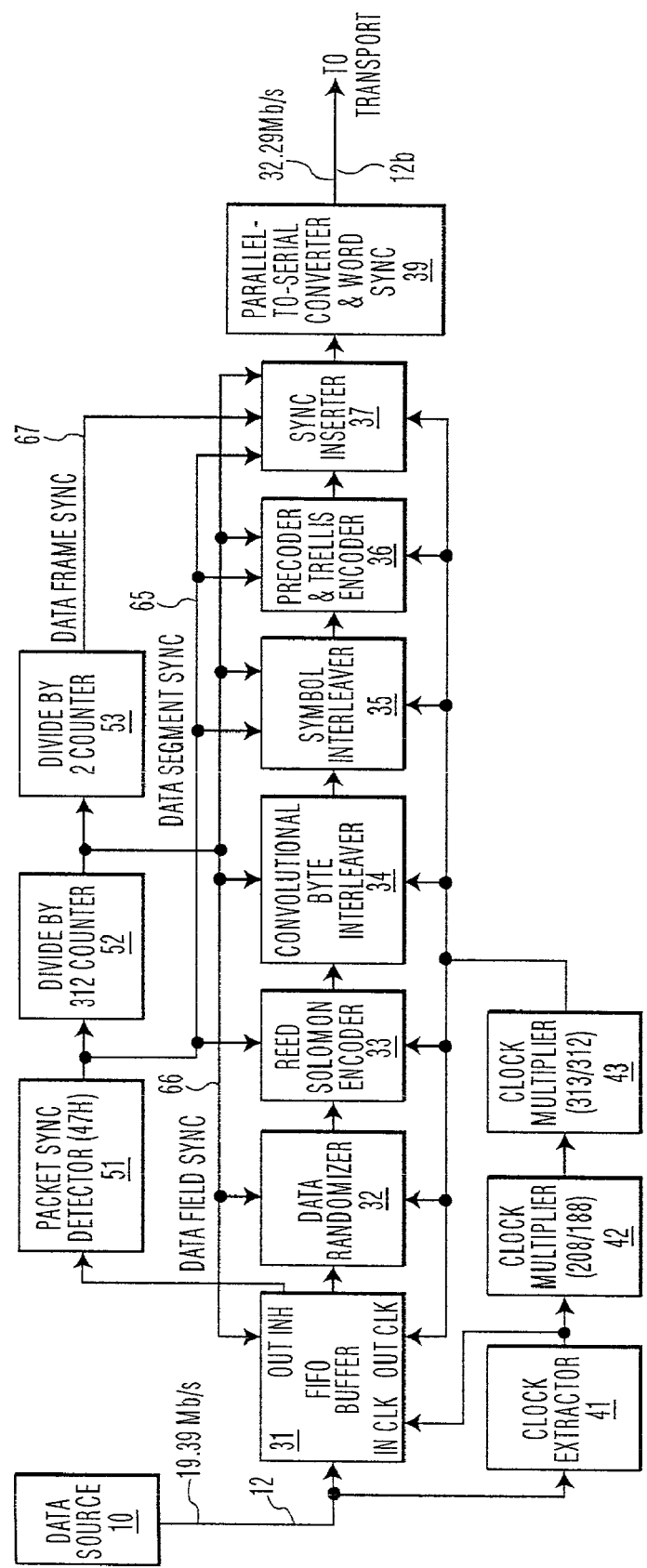
FIG. 8 is a block diagram of the centralized data processing subsystem of an 8-VSB channel encoder for the split channel coding embodiment of the system shown in FIG. 3, for which the signal processing portion is shown in FIG. 9.

The data processing subsystem of FIG. 8 is fundamentally the same as the data processing shown in the standard channel coding system of FIG. 6, with the modulator element replaced with a parallel-to-serial converter and optional word synchronizer. The Parallel-to-Serial Converter 39 takes the 3-bit parallel words from the sync inserter, which normally would go to the mapper and digital-to-analog converter (or converters, depending upon the type of modulation) in the modulator, and serializes them for transport to the transmitters. The Word Synchronizer, also contained in block 39, is optional depending upon the overall channel coding process. If the channel coding includes a repetitive pattern that can be discovered at the transmitters, then just the serialized output of the sync inserter can be transported. If the channel coding does not include such a repetitive pattern, then some kind of additional synchronization information must be inserted to allow recovery from the serial stream of the parallel words in the correct phase at the transmitters. That additional synchronization may also provide steering information for the words if more than one digital-to-analog converter is used in the modulator (as for quadrature modulation, for example.) The extra word synchronization, if needed, will increase the transport data rate somewhat. In the case of 8T-VSB signals, there is a repetitive pattern in the symbols that can be discovered at the transmitters and used for word sync.

Figure 9:
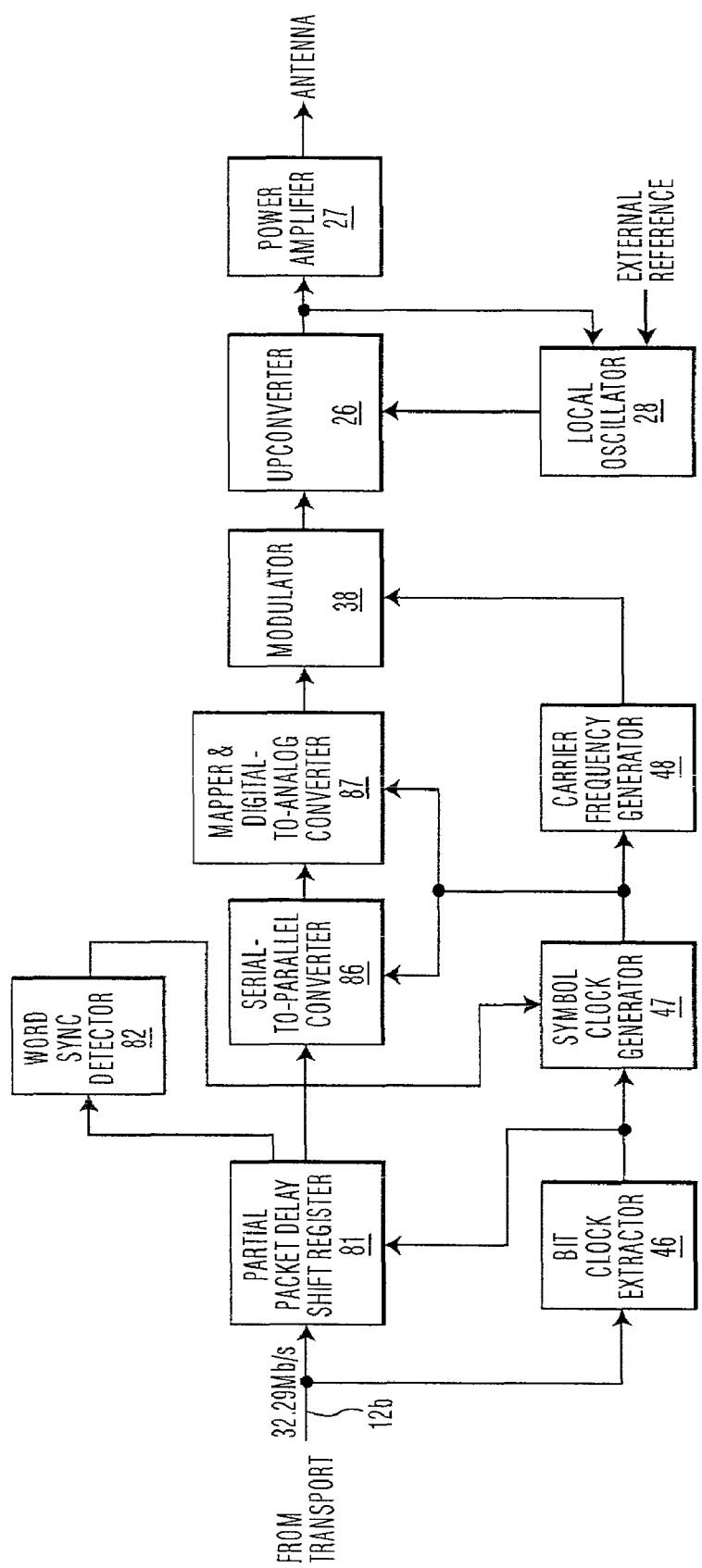
FIG. 9 is a block diagram of the signal processing subsystem for a DTV transmitter with split channel coding as shown in FIG. 3, the data processing portion of which is shown in FIG. 8.

The signal processing subsystem located at the transmitter for the split channel coding method shown in FIG. 9 starts with a Bit Clock Extractor 46 clock recovery circuit and a Partial Packet Delay Shift Register 81 that allow a parallel look at the serial data as it passes through. The Word Sync Detector 82 clock recovery element examines the bits in parallel as they pass through the shift register in serial form. When it recognizes the correct pattern in the data, either as repeated symbols that are part of the signal or as extra information that has been added for word synchronization, it triggers the Symbol Clock Generator 47 so that it clocks the Serial-to-Parallel Converter 86 to output words in the correct phase. If extra word synchronization information was added, it is removed at this point, and the data rate returns to precisely that required to yield the transmitted symbol rate. If more than one Digital-to-Analog Converter 87 is used in the modulation process, the steering of words to the correct converters would be synchronized at this point prior to removal of the word sync signals. Once the data is converted to parallel form, it passes to the Mapper and Digital-to-Analog Converter 87 where it is used to modulate the carrier in amplitude, phase, or whatever other characteristic is used to carry the information.

The carrier normally will be generated at an intermediate frequency that is upconverted to the output channel, amplified, and fed to the antenna. As noted previously, the carrier generation and upconversion processes must be synchronized to an external frequency reference so that the transmitted signals are all replicas of one another, not only in having the same symbols resulting from the same data inputs but also appearing on the same channel frequencies. Any differences in the signal frequencies emitted from the multiple transmitters cause the receiver adaptive equalizers to perceive some of the echoes as having Doppler shift and therefore to be from physically moving reflectors. The elements necessary to provide such frequency control are shown in FIG. 9 as the Upconverter 26, the Local Oscillator 28 and the Power Amplifier 27. While not shown in the diagrams of the other methods, these elements exist in all of them in order to provide precise channel frequency control. The techniques for applying such frequency control are well known in the art and therefore will not be described here in more detail. The external reference must be a signal that is available at all of the transmitter sites, such as a Loran-C or Global Positioning System (GPS) signal, and that can be recovered with high accuracy, low drift, and low phase noise.

The split channel coding method has the disadvantage that it can require a significantly higher data rate than the payload data rate in the transport channel, depending upon the type of data processing that is done to the information prior to transmission. In the 8T-VSB example, the payload data rate of 19.39 Mb/s is increased to 32.29 Mb/s.

Depending upon the type and amount of data processing used, the higher data rate can result in higher costs for transport services, where they are obtained from service providers, or it can require wider bandwidth channels where microwave interconnections are used. In locales with limited spectrum availability, this may make it impossible to obtain the necessary microwave spectrum to install the transport system, thereby limiting applicability of the system of the invention. The lower transport bandwidth requirement of the synchronized transmitter method therefore provides greater flexibility and applicability over a larger number of situations.

It should be noted that, while not explicitly shown, the preprocessing method of FIG. 5 could be applied to the split channel coding method. Similarly, it is possible to adjust the timing of the transmitters using appropriate delay functions in the signal path. Instructions could be sent to the transmitters in the form of coded data to control the time at which signals are emitted. Because of the transport of standard MPEG-2 Transport Streams to the transmitter locations completely data-processed, however, there is no inherent method for such communication, and alternate means for communicating such control data must be provided. Similarly, measurement of the time of emission may be more difficult than with the other methods since the data stream features to be measured must be extracted directly from the data stream rather than their being implicit in the functions of the various processing stages.

A further extension to the split channel coding method is the transmission by any or all of the transmitters of certain sequences of bits and/or the resulting symbols that differ from those transmitted by the other transmitters in the single frequency network. The differing bits and/or symbols can allow identification of individual transmitters in the network and/or the transmission by them of a proportion of the transmitted data that differs from one transmitter to another. The bits and/or symbols that are varied from one transmitter to the next in this way must be carefully chosen so as not to disturb the ability of receivers to treat the signal from one transmitter as primary and those from the other transmitters in the network as echoes or whatever other methods receivers may use to enable reception of signals in a multipath environment. As with transmitter timing information just discussed, a means must be provided for communicating to the individual transmitters the differences in the data they are to transmit, which could be anything from a fixed setting of the transmitters to a separate data communications channel carrying the data to be transmitted differently by each transmitter.

Synchronized Transmitter Method

In the synchronized transmitter method described previously in overview with respect to FIG. 4, the full data processing and signal processing functionality of the modulation system are retained at each transmitter. A Data Processing Model 14 is incorporated into the Data Source and Transport 10 system of FIG. 4 to preprocess the data stream so as to establish the reference times relative to the data stream at which processes that recycle do so. The Data Processing Model 14 also includes any random or statistical processes that do not have known states at known times so that information about their states can be extracted at appropriate times and communicated to the transmitters for purposes of slaving their equivalent functions to that of the model.

Several examples of the synchronized transmitter method will be presented, based on the 8T-VSB modulation system. In these examples, two types of synchronization signals are inserted into the MPEG-2 Transport Stream and then sent through the transport system to all of the transmitters to keep their data processing functions synchronous with one another. First, a Data Frame Sync Word is inserted every 624 packets to time align the data field and data frame sync signals in all of the transmitter channel coders. Second, a Trellis Code State Packet is inserted periodically into the MPEG-2 Transport Stream to carry trellis coder state data from the channel coding model at the transport system input to the multiple transmitters to lock their trellis coders together. A single MPEG-2 packet identifier (PID) value is dedicated to this purpose in each broadcast system. The PID value is fixed for a particular system but can be different in different systems. The differences between the several examples to be given all relate to the mechanisms used for insertion and carriage of the Trellis Code State Packet.

Space in the MPEG-2 Transport Stream can be made available for the Trellis Code State Packets by several methods. In the first example, space is made by replacing certain null packets with Trellis Code State Packets. So long as the Service Multiplexer 11 of FIG. 4 sends occasional null packets, the system will be fully resynchronized periodically. If it is necessary or desirable to resynchronize the system at any particular time, simply sending null packets through the system can produce the result sought. The Trellis Code State Packets are always located together with a Data Frame Sync word, and the actual Trellis Code State Packet data is processed in the Data Processing Model and is broadcast. In a second example embodiment of this method, packets having the PID value dedicated to transmitter synchronization are sent by the Service Multiplexer 11 to the Data Processing Model 14 and Transmitter Synchronization Inserter 16 of FIG. 4 at intervals of 624 packets or multiples thereof. The data within those packets are replaced, the Data Frame Sync word generation process locks to the 624-packet cadence, and the system otherwise operates exactly as in the first example. In a third example embodiment of this method, packets having the PID value dedicated to transmitter synchronization are sent by the Service Multiplexer 11 to the Data Processing Model 14 and Transmitter Synchronization Inserter 16 of FIG. 4 at random times but with known payload data. A delay of one data field duration is inserted into the Transmitter Synchronization Inserter 16, and the Trellis Code State Packet carries the trellis code state information for use at the start of the next data field. The Trellis Code State Packet is not moved and does not have to be adjacent to a Data Field Sync word. At the transmitter, the Trellis Code State Packet data are read and then replaced with the same known payload data as supplied by the Service Multiplexer 11, which data are then broadcast. Other examples could be given of the transmitter synchronization method, but they should become apparent to those skilled in the art from the examples provided.

The two synchronization signals in the example embodiments described have been kept as simple as possible and as low in overhead bit rate as possible. In each example, establishing the cadence of Data Frame Sync consists simply of inverting the MPEG-2 Transport Stream data packet sync word every 624 packets. Thus the 47h MPEG-2 packet sync words, inverted bit-by-bit, become B8h once every 624 packet sync times. Because the packet sync appears quite regularly, a very stable timebase can be established for packet sync locations. Since the value that periodically appears in place of the packet sync word is well known, it, too, can be found reliably. Moreover, once the frame sync word's location is known, it can be windowed or fly-wheel detected to make sure that the only occurrences of the B8h value that are recognized are those that happen when they are expected. Such techniques are similar to those that are normally applied to the packet sync signals themselves. How the Data Frame Sync signals are generated and inserted in the stream, then recovered and used to synchronize the transmitters will be described hereinbelow. It should be noted that the Data Frame Sync has no impact whatsoever on the system data rate.

Figure 18A:
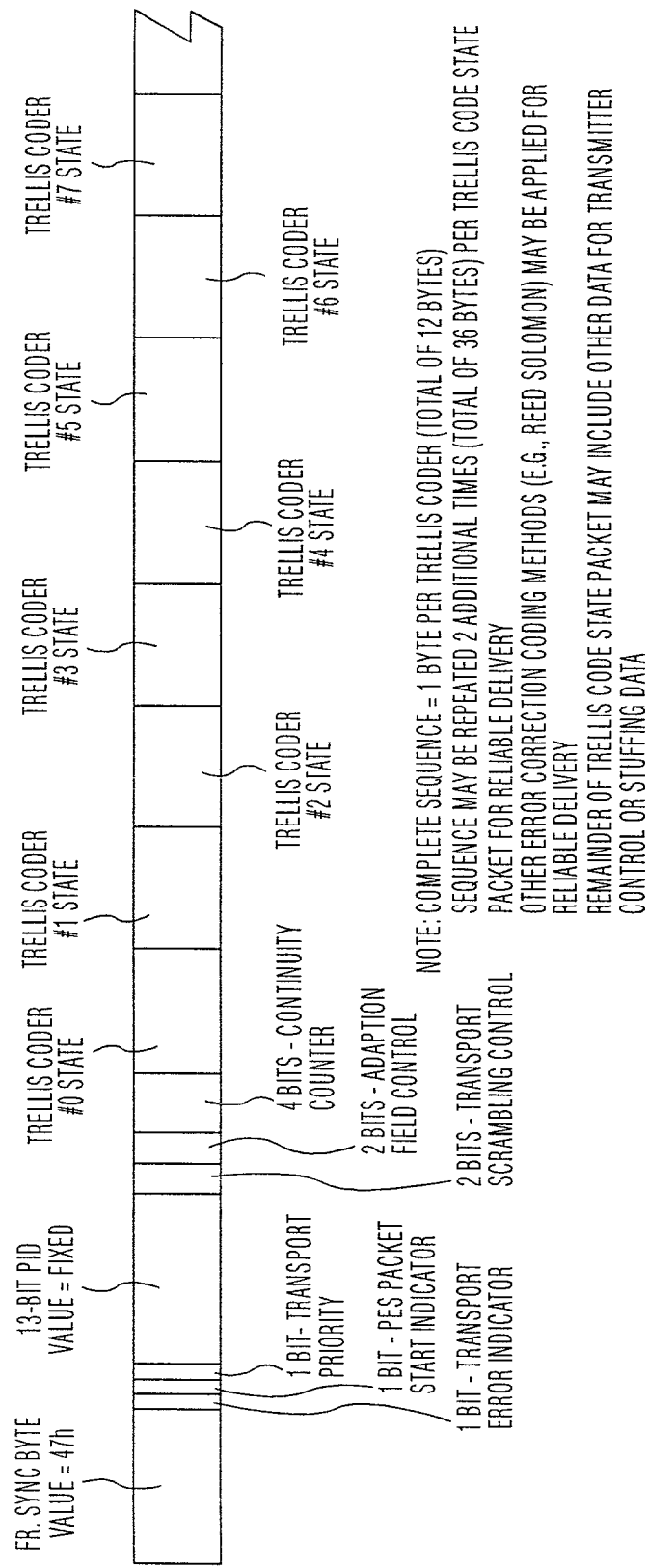
FIG. 18a is a representational diagram of a Trellis Code State Packet and FIG. 18b is a diagram of the layout of a trellis code state byte.

In the example embodiments, Trellis Code State Packets are the second synchronization signal and are used to convey the state of the trellis coder in the channel coder model at the data source end of the transport system. They carry 36 bits of data from a known point in time in the channel coder model, which bits are inserted into the transmitter channel coders at the same time relative to the payload data in the data stream to force the transmitter trellis coders into the required states. One format of a Trellis Code State Packet is shown in FIG. 18a. It will be described in more detail shortly. For now, it is sufficient to recognize that it carries 36 bits, representing three bits from each of the twelve virtual trellis coders used in the 8T-VSB system.

Figure 10:
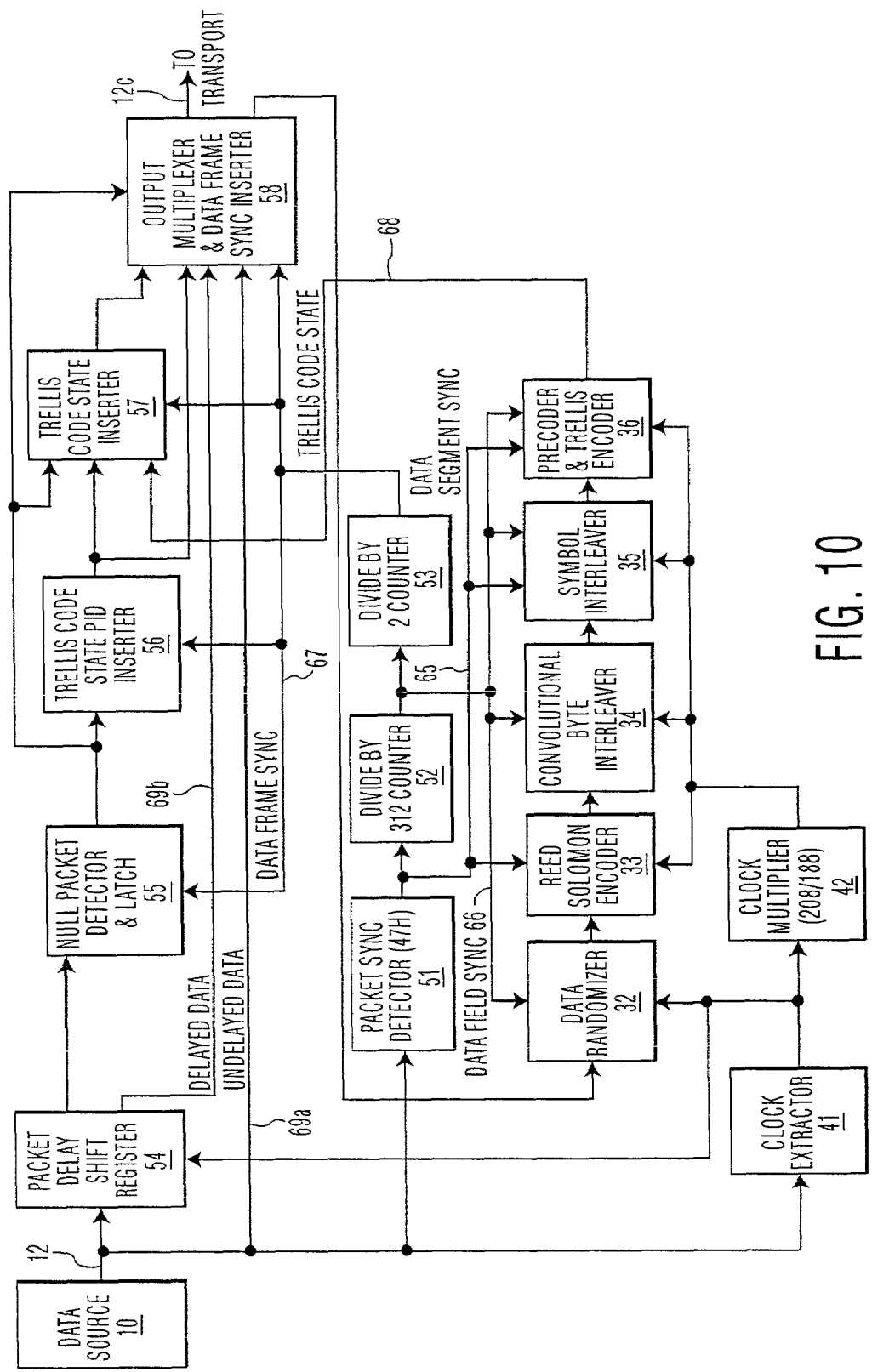
FIG. 10 is a block diagram of a data processing model and transmitter synchronization inserter for a DTV station according to the embodiment shown in FIG. 4, which synchronization inserter inserts a Trellis Code State Packet synchronously relative to the occurrence of the data frame sync word.

Turning now to system details of the first example embodiment of the synchronized transmitter method, the Data Processing Model 14 and Transmitter Synchronization Inserter 16 of FIG. 4 are detailed in FIG. 10. The bottom three rows of FIG. 10 are the essential elements of the standard channel coder of FIG. 6. The differences are that the FIFO Buffer 31 on the input and the Mapper and Sync Inserter 37 on the output in FIG. 6 have been deleted. Also deleted is the 313/312 Clock Multiplier 43 since there is no insertion of the data field or data frame synchronization segments in the data processing model. The fundamental purposes of those elements that remain are to produce the data frame synchronization timing and to develop the Pre-coder and Trellis Encoder 36 states to which all of the transmitter channel coders will be slaved. The additions to the standard encoder are all in the top row of the drawing and comprise a Packet Delay Shift Register 54, a Null Packet Detector and Latch 55, a Trellis Code State PID Inserter 56, a Trellis Code State Inserter 57, and an Output Multiplexer and Data Frame Sync Inserter 58.

Focusing on the top row of FIG. 10, data at the input are passed through the Packet Delay Shift Register 54, which is exactly one MPEG-2 Transport Stream packet (188 bytes) in length. The Packet Delay Shift Register 54 includes provisions to output Delayed Data 69b after the period of exactly one packet and to provide a look-ahead output to the Null Packet Detector and Latch 55 so that it can see a null packet coming before it is passed to the Delayed Data 69b output. The normal situation is for the data to be delayed through the Packet Delay Shift Register 54 by selection of the Delayed Data 69b input to the Output Multiplexer and Data Frame Sync Inserter 58. The latch in the Null Packet Detector and Latch 55 is reset by each Data Frame Sync signal 67. It will be set upon occurrence of the first null packet following any Data Frame Sync 67. When the Null Packet Detector 55 discovers a null packet about to arrive at the output of the Packet Delay Shift Register 54, it causes the Output Multiplexer to switch to its Undelayed Data 69a input just prior to the start of the null packet. This effectively skips the first null packet to occur after a data frame begins. It puts a minor, one-packet duration jitter into the signal. Data from the Undelayed Data 69a path continues to be sent to the output until the beginning of the next data frame period.

While the first null packet of each data frame is being removed as just described, the Packet Sync Detector 51, the Divide by 312 Counter 52, and Divide by 2 Counter 53 elements are counting 624 packets to denote a data frame. Every time a 624-packet period elapses, the Divide by 2 Counter 53 produces a Data Frame Sync signal 67 that causes the Data Frame Sync Inserter in the Output Multiplexer 58 to produce an inverted MPEG-2 Transport Stream packet sync signal (i.e., B8h instead of 47h). If, during the preceding data frame period, a null packet was detected and the Null Packet Latch 55 was set, an additional packet, called the Trellis Code State Packet, will be inserted in the output stream by the Output Multiplexer 58. The Trellis Code State Packet will start with a Data Frame Sync packet header (B8h), which will be followed by the PID value assigned within the particular system to identify packets containing trellis code state data. The payload of the Trellis Code State Packet will carry the trellis code state data from the Pre-coder and Trellis Encoder 36 of the associated channel-coding model, formatted, for example, according to FIG. 18a. The added packet will have the effect of jittering the signal back in the opposite direction and by the same amount as the jitter caused in the preceding data frame by removal of the null packet. During the time period of the Trellis Code State Packet, the next packet from the input will transit through the Packet Delay Shift Register 54, arriving at its output just as the Trellis Code State Packet completes. At that point, the Output Multiplexer 58 will switch back to the Delayed Data path 69b, passing through the next data packet from the input. The effect of this process is to remove the first null packet to appear in a data frame, replacing it with a Trellis Code State Packet at the start of the next data frame.

Figure 11:
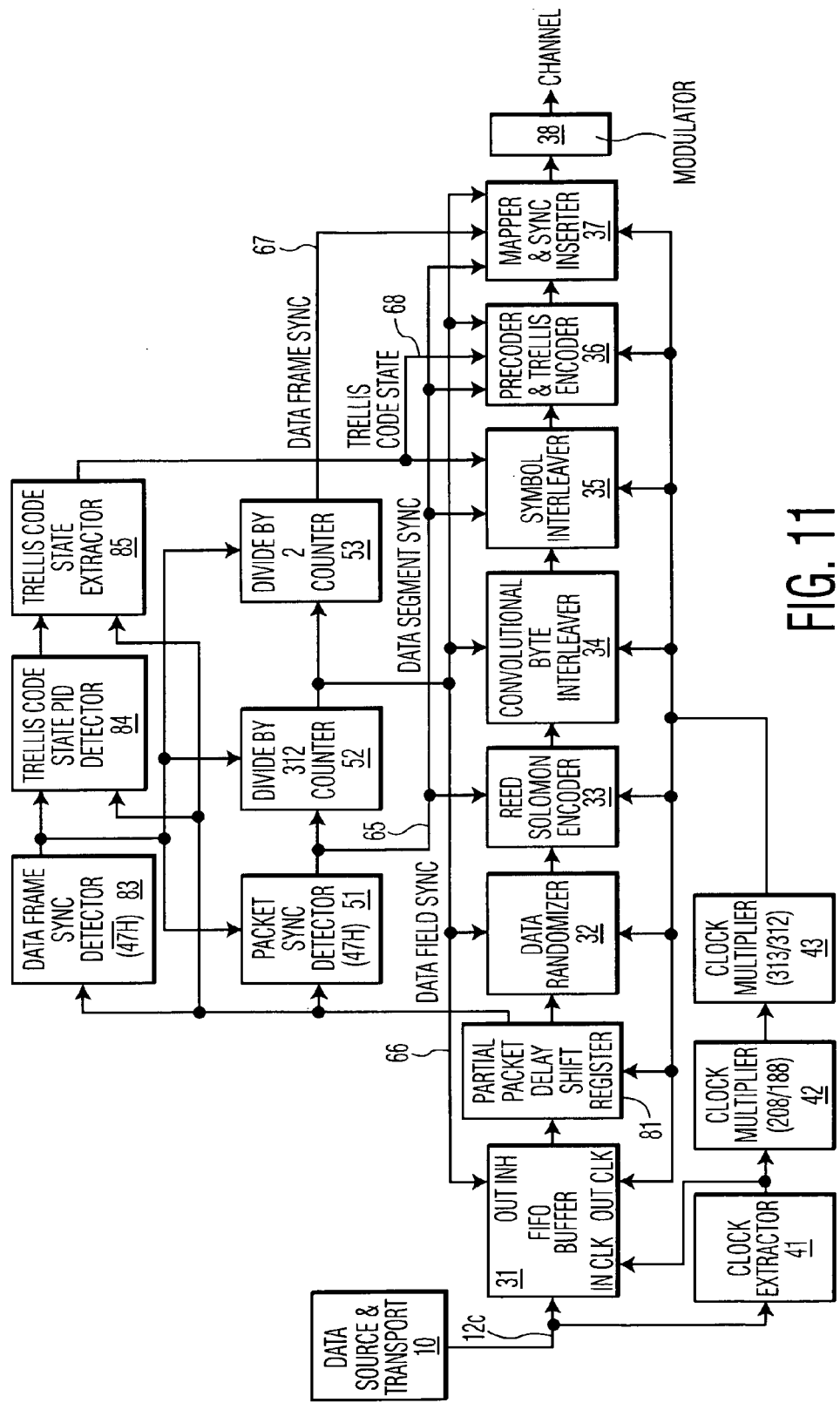
FIG. 11 is a block diagram of a synchronized 8-VSB channel encoder for a DTV station modulator according to the embodiment shown in FIG. 4, which channel encoder accepts a Trellis Code State Packet appearing synchronously in its input relative to the occurrence of the data frame sync word.

FIG. 11 shows the block diagram of a synchronized transmitter channel coder. When compared to FIG. 6, it will be noted that additions are the Data Frame Sync Detector 83, the Trellis Code State PID Detector 84, and the Trellis Code State Extractor 85 in the top row and the Partial Packet Delay Shift Register 81 in the third row of the drawing. The Data Frame Sync Detector 83 works similarly to the normal Packet Sync Detector 51 except that it recognizes the inverted sync pattern. The design of the Data Frame Sync Detector 83 should assure that the B8h value (i.e., inverted 47h) falls within the stream at a time when a 47h Packet Sync word would be expected. The output of the Data Frame Sync Detector 83 sets the Packet Sync Detector 51 so that the normal packet synchronization functions occur on the presence of both the normal and inverted values when they appear at the correct times in the stream. The Data Frame Sync Detector 83 output also resets the Divide by 312 Counter 52 and the Divide by 2 Counter 53 so that data frames are aligned in time at all transmitters in the system.

The Data Frame Sync Detector 83, Trellis Code State PID Detector 84, and Trellis Code State Extractor 85 are all fed from the Partial Packet Delay Shift Register 81. The shift register allows collection of data at earlier points in the delay chain so that events in the normal channel coding system that begins with the Data Randomizer 32 can be anticipated. Thus, when a Data Frame Sync signal is recognized, the PID value for the upcoming data packet can be checked in advance of its moving into the regular channel coder, and the Trellis Code State data 68 can be extracted when the Trellis Code State Packet is present. This allows the Trellis Code State 68 to be loaded into the Symbol Interleaver 35 and the Pre-coder and Trellis Encoder 36 during the data frame synchronization segment. In this example, the Trellis Code State PID always occurs in conjunction with a data frame sync word (B8h) and thus the Trellis Code State Packet, when it is present, is always the first packet to be sent following a data frame sync word. It carries the trellis code state information from the data processing model that existed just prior to the data frame sync word and thus carries the state information from which the transmitter trellis coder must continue after its insertion of the Data Frame Sync data segment.

Figure 18B:
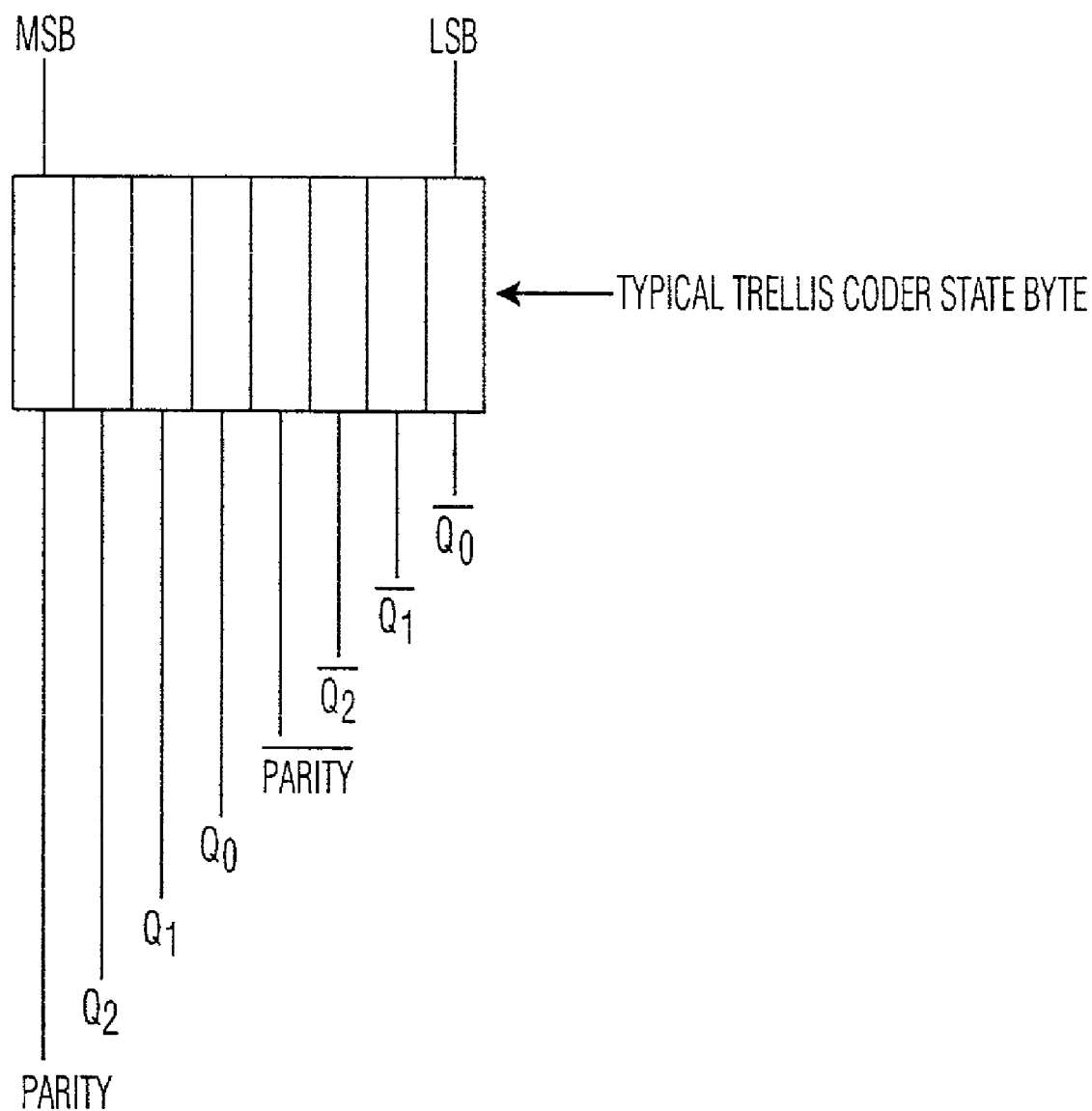

In the example 8T-VSB system, there are 36 bits of Trellis Code State data to be carried from the Data Processing Model 14 of FIG. 4 to the RF Transmission System 20. In the example packet structure given in FIG. 18a, the data are packaged into twelve bytes, each byte carrying the three bits of state data derived from one of the twelve trellis coders conceptually used in the system. A parity bit (even) is added to the three data bits, and the total of four bits is also carried inverted in the same byte for redundancy. This arrangement of a byte carrying the state data from one of the twelve trellis coders is shown in FIG. 18b. The sequence of twelve bytes carrying the trellis coder state data may be repeated two additional times in succession, perhaps spread to different portions of the packet for further reliability, in order to enable majority logic to be applied at the transmitter end of the system for improved reliability. While this amount of redundancy for the trellis coder state data might seem excessive, it should be pointed out that the other sync signals occur quite frequently and can be made highly reliable using windowing and/or flywheel techniques. In systems having relatively reliable transport to the transmitters, the Trellis Code State Packets may be sent very infrequently, so windowing and similar techniques may not be applicable. Moreover, the data they carry will be different every time they are sent. Hence it is important to make the data frame sync packets reliable on their own, without the possibility of use of windowing or flywheel methods. As will be apparent to those of ordinary skill in the art, other methods of protecting the data in the Trellis Code State Packets are possible. For example, Reed Solomon error correction coding just as well could be applied to the Trellis Code State Packets for transmission through the transport system with forward error correction applied at the transmitter end of the link.

In any event, it is important that the redundancy built into the data sent in the Trellis Code State Packets be used to achieve the maximum accuracy possible for that data. It is the only system timing and synchronization data that cannot be derived from the repetition rates of various clocks. If there are errors in the data recovered, it is far better not to update the Trellis Encoders 36 at a transmitter, waiting for the next occurrence of a Trellis Code State Packet, than to preset the Trellis Encoders 36 to an incorrect value. It should be noted that the structure of the Trellis Code State Packet defined in FIG. 18a follows all the MPEG-2 rules for Transport Stream packets. When used with the first example synchronization method, in which the Trellis Code State Packet is always attached to a Data Frame Sync word, the packet is modified by the inversion of the packet sync word (from 47h to B8h), as described previously. The same is true in the second example, to follow, in which the packet insertion remains synchronous. In the third example, also to follow, in which the packet insertion is asynchronous, the packet sync word is normal except on those occasions when a Trellis Code State Packet is coincidently the first packet in a data frame.

In the Channel Coding Model associated with the Transmitter Synchronization Inserter, as shown in FIG. 10, there is no need to insert a segment of field or frame sync, so, as previously noted, the 313/312 Clock Multiplier 43 of FIG. 6 is omitted.

Similarly, there is no need to accumulate packet data while the field and frame sync segments are transmitted, so the FIFO Buffer 31 is omitted. As a consequence of these deletions, the Data Randomizer can run at the same rate as the data input. The Reed Solomon Encoder has the effect of speeding up the remainder of the Channel Coder Model (although not the rate of the data passing through the upper path) by 208/188. Appropriate buffering is therefore needed in the area of the R-S encoder to account for this speed change. The latter portion of the Channel Coder Model runs on a clock speeded up by the 208/188 factor.

Figure 12:
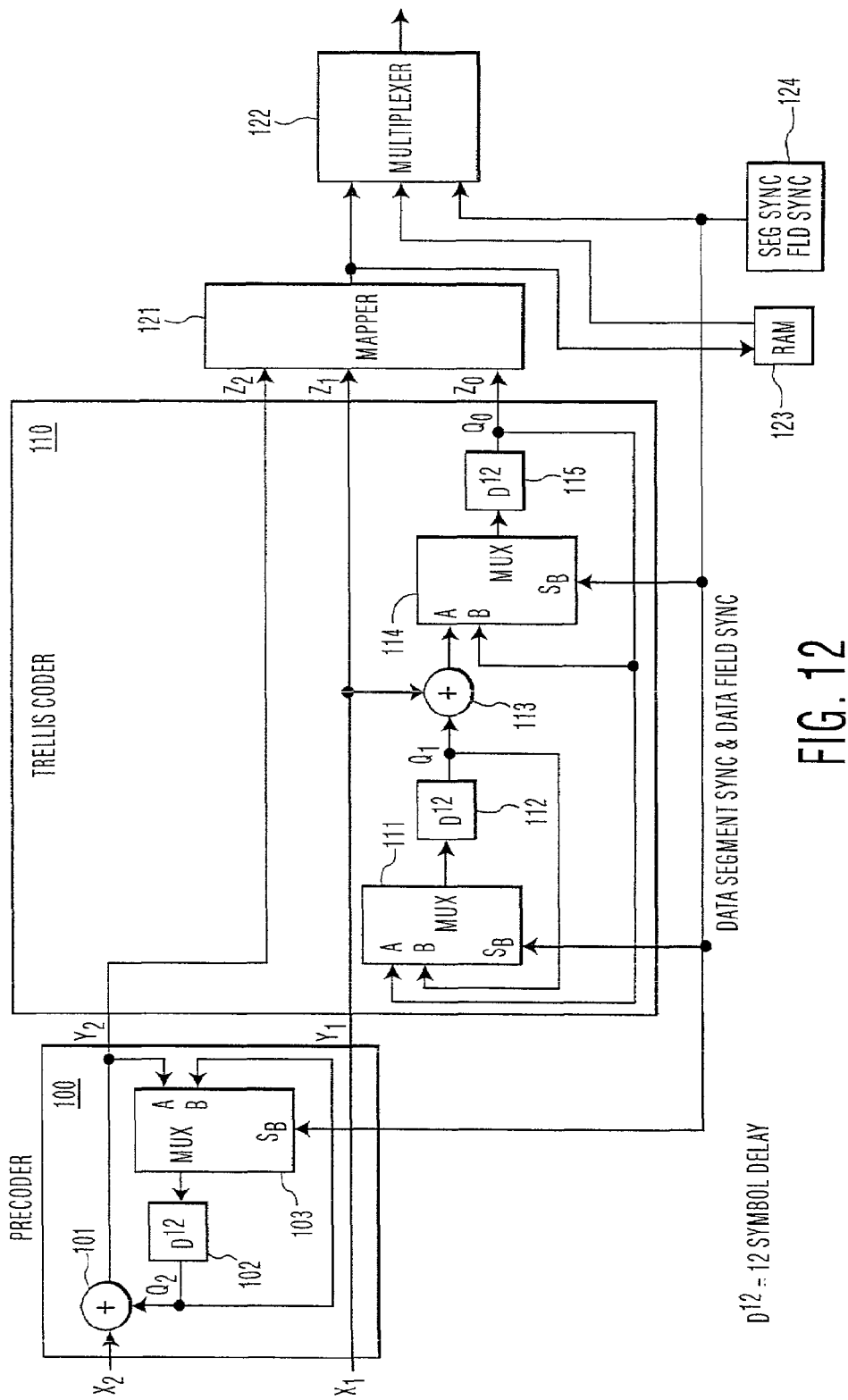
FIG. 12 is a block diagram of a standard 8-VSB pre-coder, trellis coder and mapper for the standard channel encoder of FIG. 6.

Examining the Pre-coder and Trellis Encoder functionality in more detail, a standard 8-VSB subsystem, including the Mapper and Sync Inserter, is shown in FIG. 12 and will be collectively called the Trellis Encoder. Without going into detail of the operation of the Trellis Encoder itself, which is well covered in the literature, it should be noted that the pre-coder has one delay element and that the trellis coder has two—each delay element having a delay period equal to 12 output symbols. The delay elements function normally except during Data Segment Sync and Data Field Sync periods, when their values are retained by recirculating their outputs to their inputs through the B inputs of the multiplexers that feed them. The recirculation is controlled through the $S_B$ inputs to the multiplexers.

Figure 13:
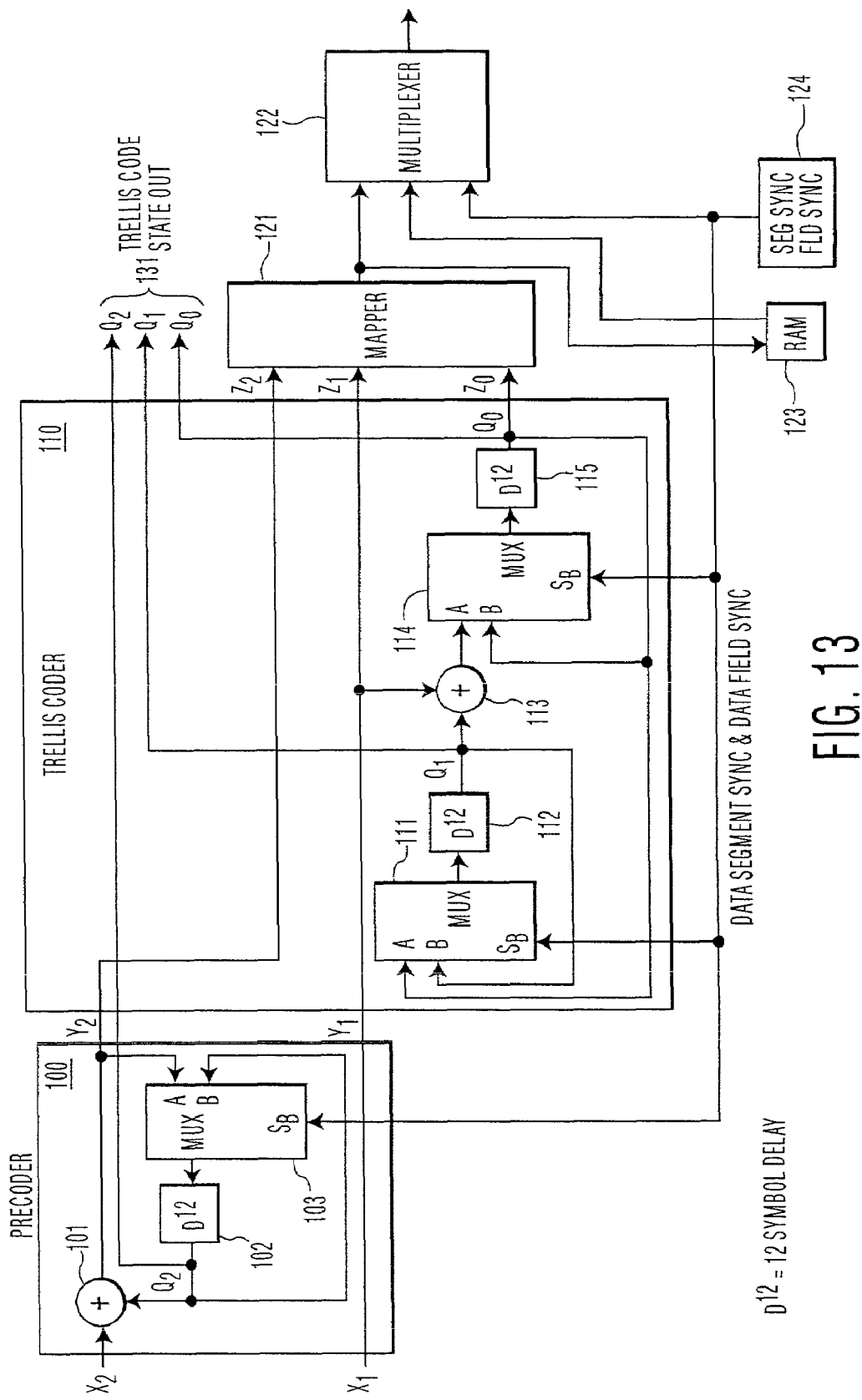
FIG. 13 is a block diagram of a trellis coder synchronization source for generating a trellis code state output for insertion into the data stream by the synchronization inserter of FIG. 10.

Unlike all the other elements of the channel coding system, there is no time when the states of the Trellis Encoder Delay Elements 102, 112, and 115 are defined; they can adopt any random starting states and proceed from there. Thus, the preferred way in which to synchronize the Trellis Encoders at several transmitters is to let one unit free-run and to slave the other units to the free-running one. The trellis code state data that are forwarded by the Transmitter Synchronization Inserter 16 of FIG. 4 to each transmitter are derived as shown in FIG. 13. In this instance, a Trellis Encoder free runs just as in the standard 8-VSB Pre-coder and Trellis Encoder of FIG. 12. The Trellis Code State Output 131, carrying the states of the Trellis Encoder Delay Elements 102, 112, and 115, is fed to the Trellis Code State Inserter 57 of FIG. 10, where the states are sampled at appropriate times and fed to the Output Multiplexer 58 for construction of the Trellis Code State Packet.

Figure 14:
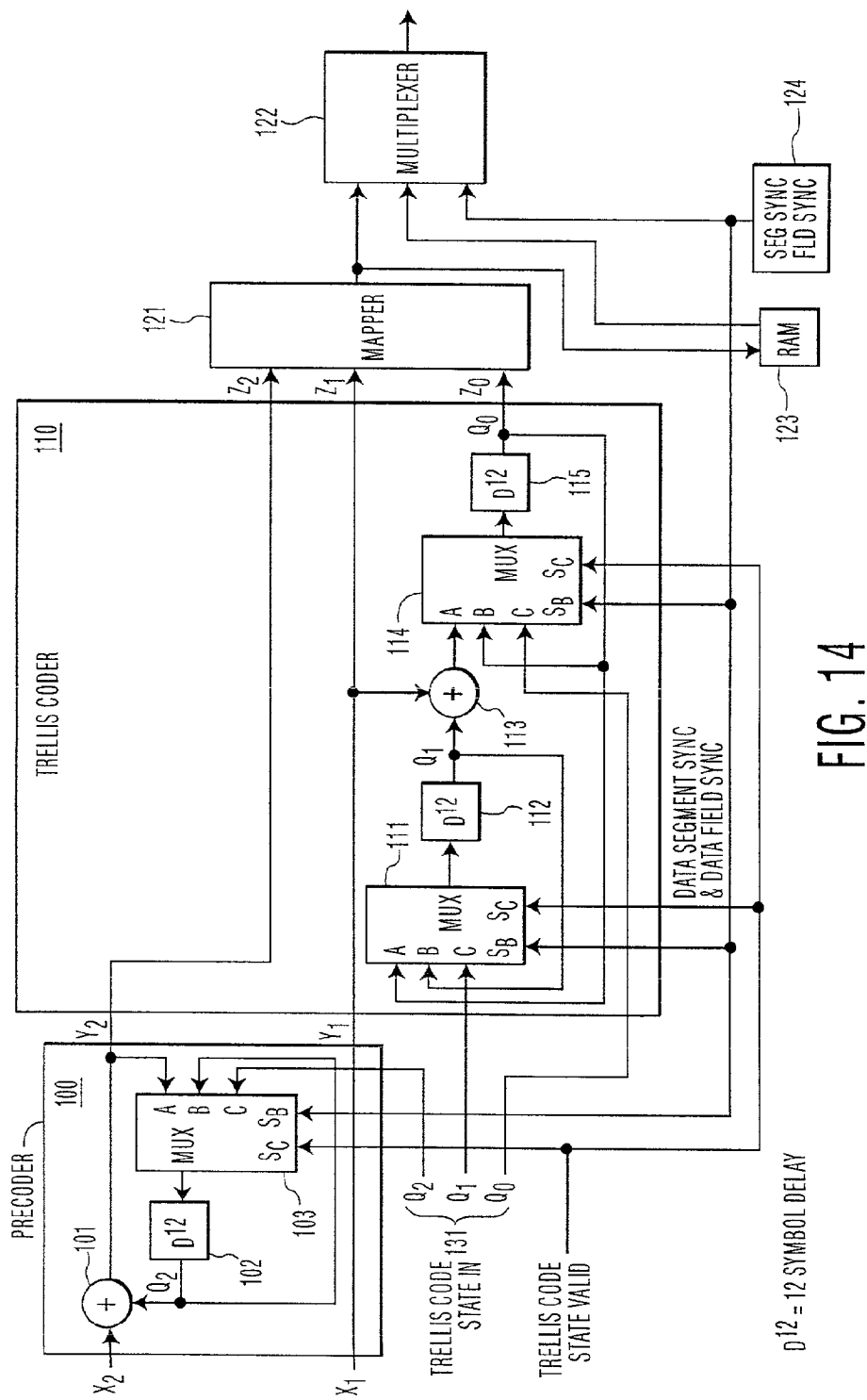
FIG. 14 is a block diagram of a synchronizable 8-VSB pre-coder, trellis coder and mapper, responsive to a trellis code state input, for the channel encoder of FIG. 11.

The slaving functionality is shown in FIG. 14. In this case, the Trellis Code State Extractor 85 of FIG. 11 collects the Trellis Code State data from the incoming data stream arriving at a transmitter. It passes the state data to the Trellis Code State Input 131 of the Trellis Encoder with a flag that indicates when the data are valid. The flag causes the $S_C$ control inputs to select the C inputs of the respective Multiplexers 103, 111, and 114 controlling the inputs to the Trellis Encoder Delay Elements 102, 112, and 115. As a result of this selection, the data from the Trellis Code State Extractor are loaded into the corresponding delay elements. This only occurs during the period while the data frame sync segment is being transmitted and just prior to the Trellis Code State Packet entering the Data Randomizer for processing for transmission.

Figure 15:
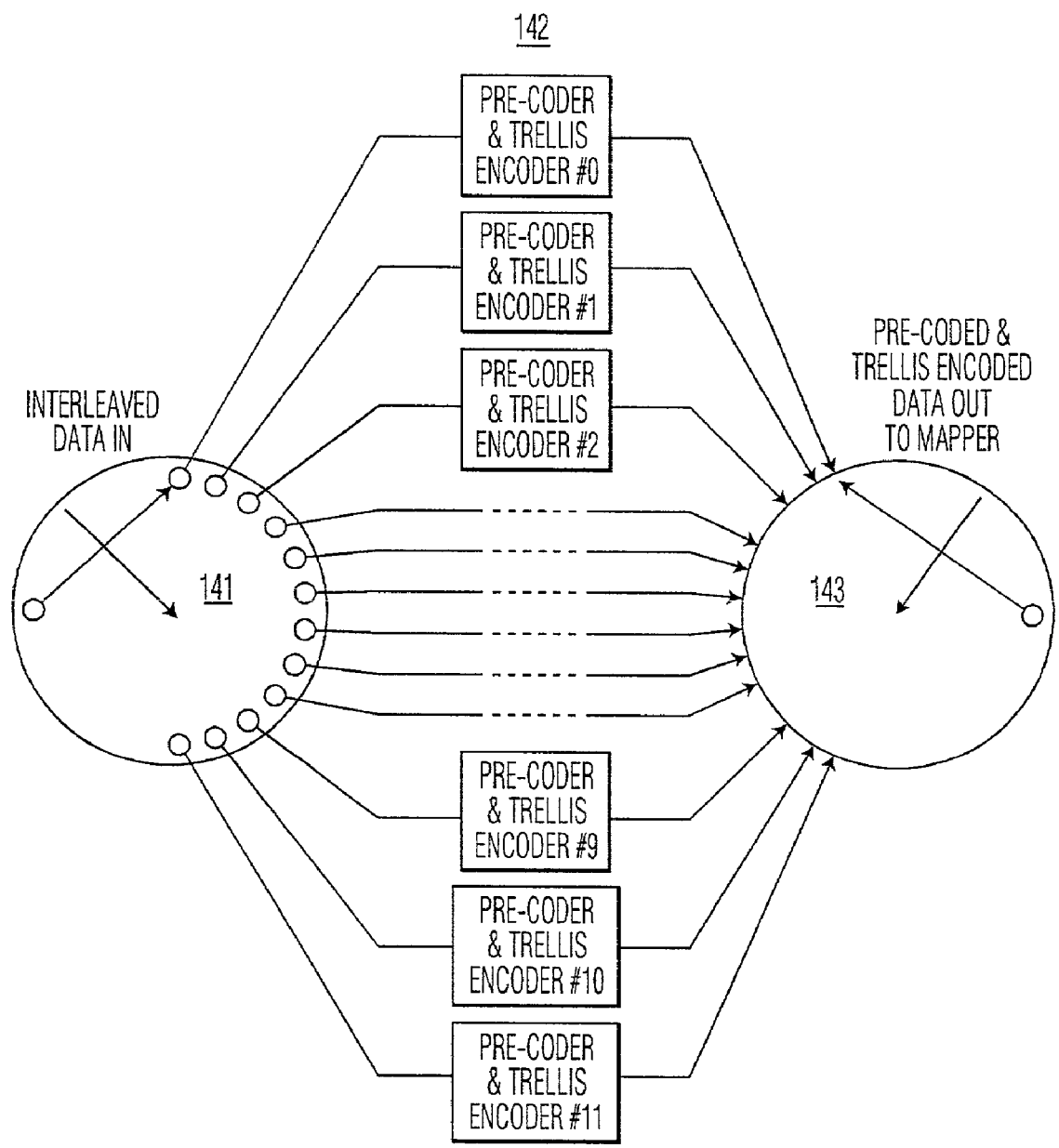
FIG. 15 is a representational diagram of a standard 8-VSB trellis code interleaver for the standard channel encoder of FIG. 6.

To enable filtering of co-channel interference caused by NTSC stations to DTV reception, the Pre-coder and Trellis Coder 36 operate on sequences of twelve symbols at a time. This is the reason for the notations on FIGS. 12 through 14 that the delay elements, $D^{12}$, represent 12 Symbols Delay. Each symbol in a sequence is processed in conjunction with the symbol that comes 12 symbols before it and 12 symbols after it, hence the factor of twelve symbols delay in the delay elements. The Symbol Interleaver 35 that precedes the Pre-coder and Trellis Encoder 36 of FIG. 6 handles the structuring of the data for processing in this way. Another way to contemplate the process is as a group of twelve pre-coders and trellis encoders operating in parallel, with each member of the group operating at one-twelfth of the symbol rate. This is shown in FIG. 15, in which byte-interleaved data is fed to the Commutator 141 on the input side and taken from the Decommutator 143 on the output side. Bytes are fed to each Pre-coder and Trellis Encoder 142 in succession, which then operate on a pair of input bits at a time, producing three output bits at a time, until the full byte is processed. Each of the twelve Pre-coder and Trellis Encoder 142 combinations has three storage elements, as shown in FIGS. 12 through 14, so the twelve members of the group taken together have 36 storage elements. It is the states of these 36 storage elements that must be communicated from the synchronization source to the slaved units.

Figure 16:
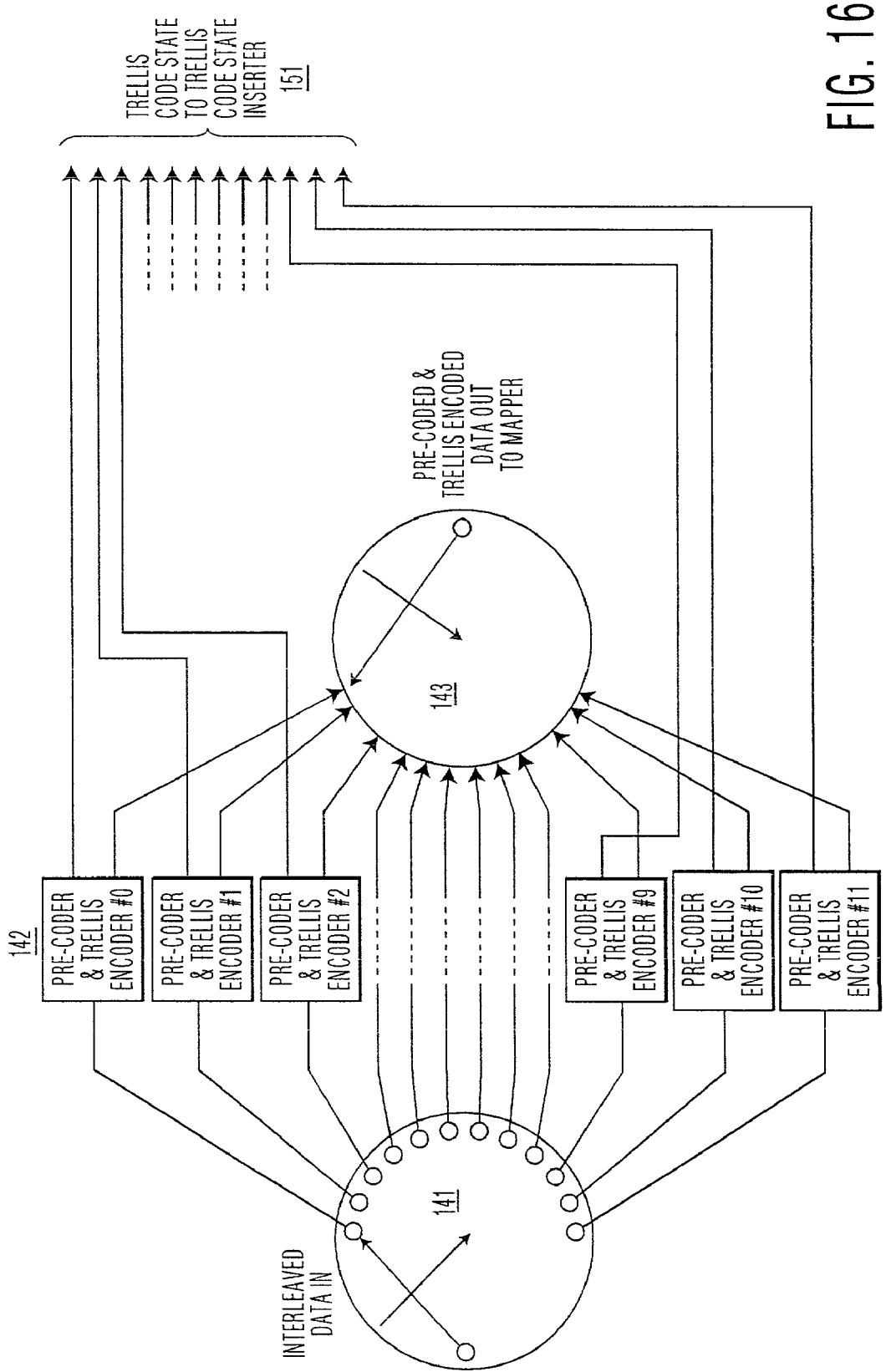
FIG. 16 is a representational diagram of a trellis code interleaver synchronization source, for generating a trellis code state output in the data processing model of FIG. 10.
Figure 17:
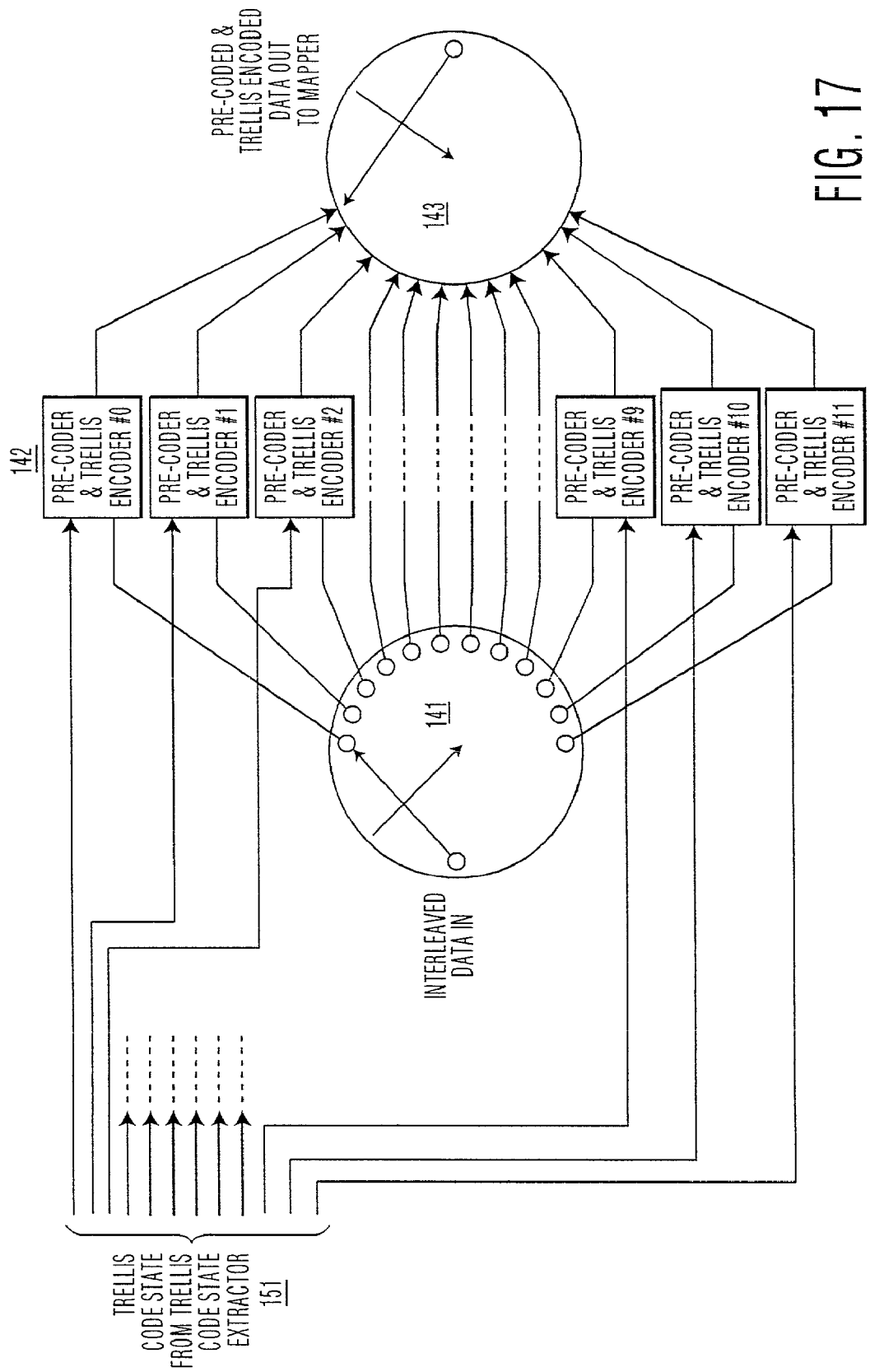
FIG. 17 is a representational diagram of a synchronized 8-VSB trellis code interleaver, responsive to a trellis code state input, for the synchronized channel encoder of FIG. 11.

The Trellis Code State Outputs 151 from the free-running Trellis Code Interleaver Synchronization Source of FIG. 16 carry Trellis Code State information on its way to the Trellis Code State Inserter 57 of FIG. 10. In FIG. 16, each arrow represents the three states of the associated source Trellis Coder Delay Elements 102, 112, and 115 in FIG. 13. The Trellis Code State Inputs 151 from the Trellis Code State Extractor 85 of FIG. 11 act to slave the group of Pre-coder and Trellis Encoder combinations 142 in FIG. 17, where each arrow pointing into one of the twelve parallel units represents the three states of the associated slaved Trellis Coder Delay Elements 102, 112, and 115 in FIG. 14 to which the Trellis Encoders will be slaved. The data sent from the synchronization source in the Channel Coding Model shown in FIGS. 4, 10, 13 and 16 are transmitted to the Synchronized Channel Coders shown in FIGS. 4, 11, 14, and 17, using the data format shown in FIG. 18a. The data are sent with parity protection on each group of three state-bits from a Pre-coder/Trellis Encoder, repeated within the same byte in bit-wise inverted form, and the sequence of twelve bytes is transmitted three times. Other formatting requirements of the Trellis Code State Packet are also shown in FIG. 18a. As noted previously, other forms of data protection, such as Reed Solomon error correction coding (ECC) and forward error correction (FEC), could be used in place of the majority logic approach.

Alternate Transmitter Synchronization Inserter—Synchronous Packet

Figure 19:
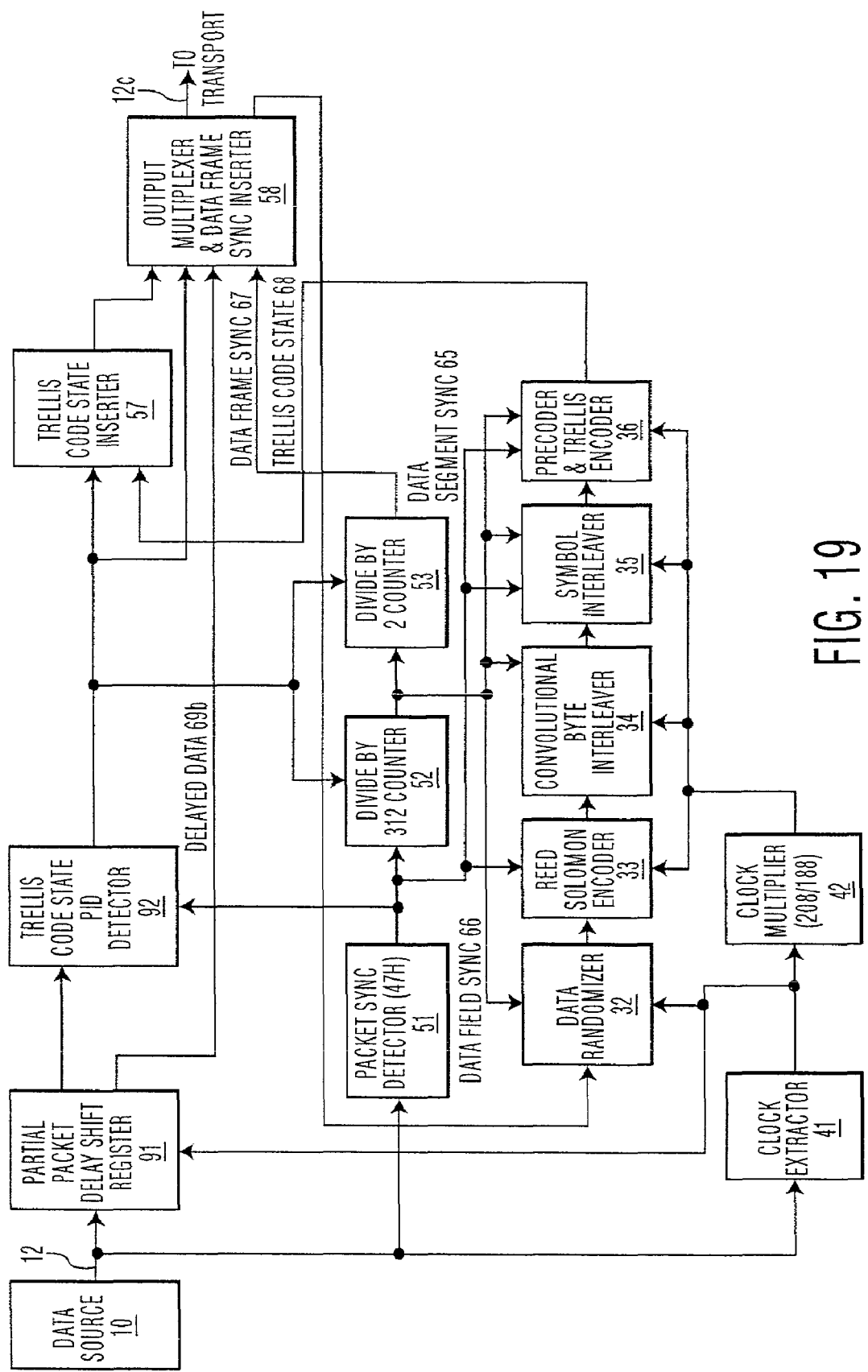
FIG. 19 is a block diagram, similar to FIG. 10, of an alternative transmitter synchronization inserter for a DTV station that inserts a Trellis Code State Packet synchronously relative to the data frame sync indicator.

For the synchronized transmitter method, the first example of inserting synchronization information at the central location was described previously with respect to FIG. 10. It depends upon the input from the Service Multiplexer 11 of FIG. 4 only to contain an occasional null packet to provide space for carrying the state of non-synchronized data processes, but it makes the Transmitter Synchronization Inserter more complex. If the Service Multiplexer 11can insert more complex structures at appropriate times, it is possible to somewhat simplify the Transmitter Synchronization Inserter. This is shown in FIG. 19, as would be applicable to 8T-VSB, for example.

Instead of finding null packets in the stream and replacing them with packets to carry synchronization information at the times required, the Service Multiplexer 11 is programmed to insert at the necessary times packets having the proper PID value reserved for transmission system use. The data in those packets are null and will be replaced by the Alternate Transmitter Synchronization Inserter shown in FIG. 19. The simplification is largely in the top row of the figure. There is no longer a need to delay and un-delay the data to allow moving packets around. Instead the Trellis Code PID Detector 92 looks for the dedicated PID value and triggers a number of processes when it occurs. The dedicated PID value must occur at multiples of the counter value for the synchronized processes. In the case of 8T-VSB, this means at multiples of 624 packets. The Counters 52 and 53 in the second row of the figure will still cause the Data Frame Synchronization 67 words to be inserted into the stream at the appropriate places. So, once the cadence is established, it must be maintained by the service multiplexer supplying the packets in the right places in the MPEG-2 Transport Stream, although it is not required that they be present every possible time. The synchronization packets will always follow a Data Frame Synchronization word, as in the first-described example of the method.

In the 8T-VSB example, besides setting the timing of the Counters 52 and 53, the occurrence of the dedicated PID value causes the Trellis Code State Inserter 57 to collect the data from the Pre-coder and Trellis Encoder 36 and to insert it into the dedicated packet in the correct format. The model of the data processing subsystem that is part of the Alternate Transmitter Synchronization Inserter of FIG. 19 functions in the same way as the one previously described for FIG. 10 and produces the non-synchronized data to which all of the data processing subsystems at the transmitters will be slaved. The advantage of this alternate method is that there is no packet jitter introduced into the data that is transported to the transmitters. The disadvantage is that the control of the Service Multiplexer must be considerably more complicated in order to put the necessary components into the data stream at the correct times. This may not be possible with existing equipment.

Alternate Transmitter Synchronization Inserter—Asynchronous Packet

In both of the preceding examples of the synchronized transmitter method, the Trellis Code State Packet was located at the Data Frame Sync word in the MPEG-2 Transport Stream and was transmitted starting in the first data segment following the Data Frame Sync data segment. Such a synchronous relationship between the Trellis Code State Packet and the Data Frame Sync has some advantages in terms of system simplicity, but it eliminates some flexibility. It also may obstruct the use of the first data segment following Data Frame Sync by some enhancements to the 8T-VSB system that otherwise may be possible. Consequently, the third example embodiment of the transmitter synchronization method has an asynchronous relationship between the Trellis Code State Packet and the Data Frame Sync word, i.e., the Trellis Code State Packet may appear at any time within the MPEG-2 Transport Stream. The Trellis Code State Packet data therefore may apply to any Data Field Synchronization segment, not just a Data Frame Synchronization segment.

To enable operation of the sort described, it is necessary for the Service Multiplexer 11 of FIG. 4 to insert occasionally packets having the PID value reserved for use by the transmission system. Moreover, those packets must have known payload data loaded in them, either by the Service Multiplexer itself or by some other element of system equipment that can produce a packet of data to be multiplexed into the MPEG-2 Transport Stream. The known data will be processed by the Data Processing Model 14 of FIG. 4 and then replaced with Trellis Code State Packet data by the Transmitter Synchronization Inserter 16. The Trellis Code State Packet data will represent the trellis code state information to be loaded into the slaved trellis encoders prior to the next data field.

Figure 20:
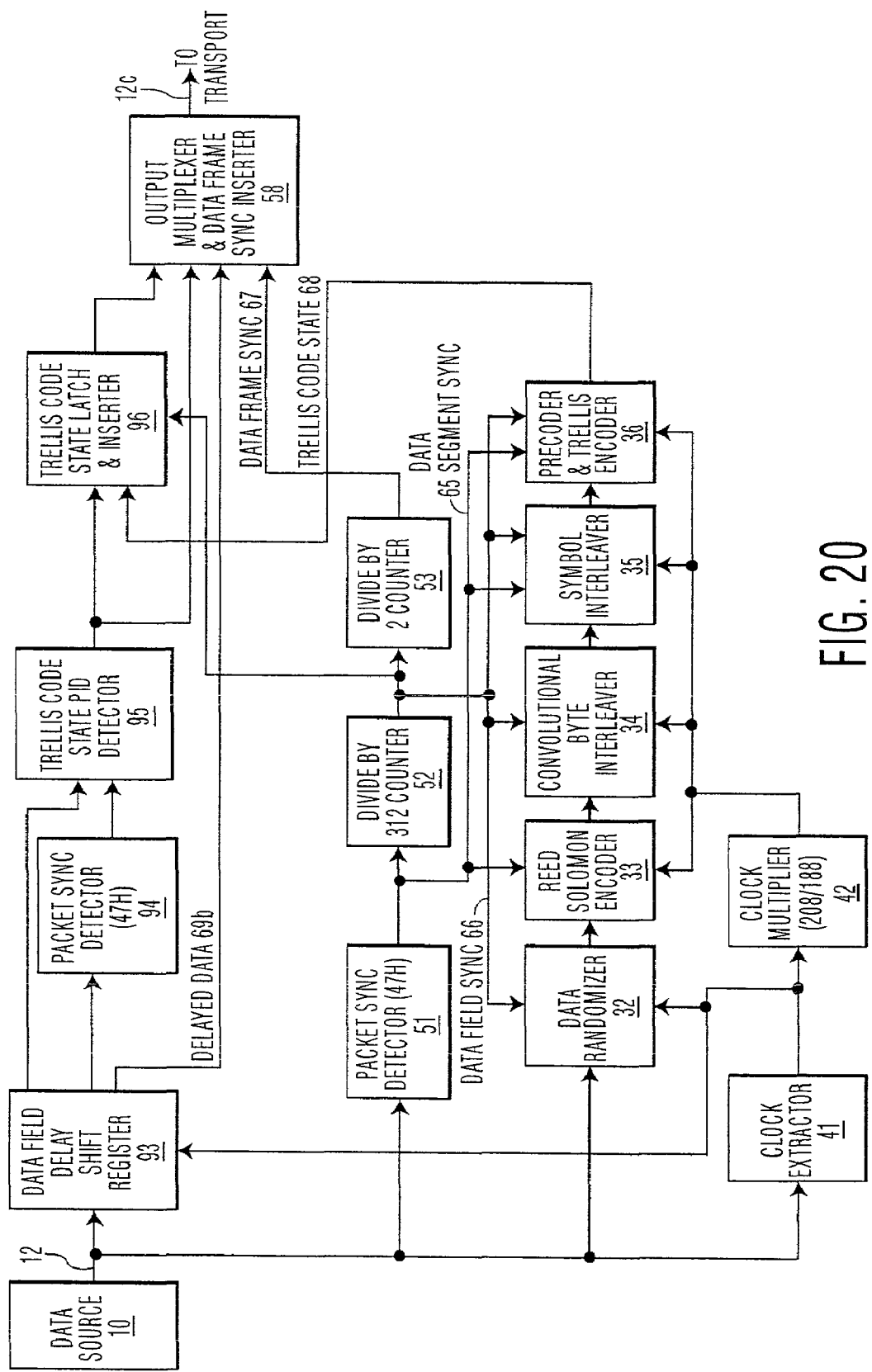
FIG. 20 is a block diagram of another alternative transmitter synchronization inserter for a DTV station that inserts a trellis code state packet asynchronously relative to the data frame sync indicator.

The details of a Data Processing Model 14 and Transmitter Synchronization Inserter 16 that operate with asynchronous insertion of the Trellis Code State Packet are shown in FIG. 20. In this embodiment, the bottom three rows of the figure are essentially the same in configuration and operate in the same way as the same portion of the embodiment shown in FIG. 10. The primary difference is that the system in FIG. 20 operates with the Data Randomizer 32 fed directly with the MPEG-2 Transport Stream 12 from the Data Source 10 rather than with the output of the Output Multiplexer and Data Frame Sync Inserter 58 as in FIG. 10. This change allows the Data Processing Model 14 of FIG. 4 (approximately equivalent to the bottom three rows of FIG. 20) to process the MPEG-2 Transport Stream just as it receives it from the Service Multiplexer 11 of FIG. 4. In this example of the method, the Counters 52 and 53 that generate the Data Field Sync 66 and Data Frame Sync 67, respectively, operate independently, only clocked by the output of the Packet Sync Detector 51. Thus, they will generate Data Field Sync 66 and Data Frame Sync 67 at random times relative to the data in the MPEG-2 Transport Stream but always on 312 and 624 packet intervals, respectively.

The upper row in FIG. 20 is similar to that in FIG. 10 with the major change being that the Packet Delay Shift Register 54 of FIG. 10 becomes the Data Field Delay Shift Register 93 of FIG. 20. This is followed by a Packet Sync Detector 94 that locates packet sync words (47h) in the MPEG-2 Transport Stream 12 and triggers the Trellis Code State PID Detector 95 to examine the following bits of the packet header for the presence of the PID value reserved for use by the transmission system. When the reserved PID value is found, the Trellis Code State Latch & Inserter 96 is triggered to output the Trellis Code State Packet payload data to the Output Multiplexer 58, as will be described shortly.

Returning to the Data Processing Model in the bottom three rows of FIG. 20, the Pre-coder and Trellis Encoder 36 outputs Trellis Code States 68 to the Trellis Code State Latch & Inserter 96 on a continuous basis. Once every 312 packets, as controlled by the Data Field Sync 66 from the Divide by 312 Counter 52, the Trellis Code State Latch captures the state of the Pre-coder Trellis & Encoder 36. It holds that set of values until the next occurrence of the Data Field Sync 66. If a packet having a Trellis Code State Packet PID value is received from the Service Multiplexer, the payload data in that packet is replaced with the Trellis Code State 68 data that was stored in the Trellis Code State Latch & Inserter 96. The replacement is done in the Output Multiplexer & Data Frame Sync Inserter 58 under control of the output of the Trellis Code State PID Detector 95. Because the Output Multiplexer & Data Frame Sync Inserter 58 has as its normal input the MPEG-2 Transport Stream Delayed Data 69b, which is delayed by one Data Field period from the input to the Data Processing Model, the Trellis Code State data 68 that is inserted into the output MPEG-2 Transport Stream 12c will represent the Trellis Code State 68 for the upcoming Data Field Synchronization or Data Frame Synchronization data segment. Consequently, the Trellis Code State Packet may appear anywhere within the MPEG-2 Transport Stream, and it will carry the Trellis Code State information for the next Data Field Sync or Data Frame Sync interval.

Alternate Transmitter Configuration—Asynchronous Packet

Because the Trellis Code State Packet can appear in the MPEG-2 Transport Steam asynchronously relative to the Data Field Sync or Data Frame Sync, some differences are required in the configuration of the data processing subsystem at the transmitter as compared to the configuration when packets appear inserted synchronously in the stream. These differences can be seen in FIG. 21, which shows the Transmitter Channel Coding system when there is Asynchronous Trellis Code State Packet insertion. Comparison with the Transmitter Channel Coding for Synchronous Trellis Code State Packet insertion shown in FIG. 11 will be helpful in understanding the differences.

Figure 21:
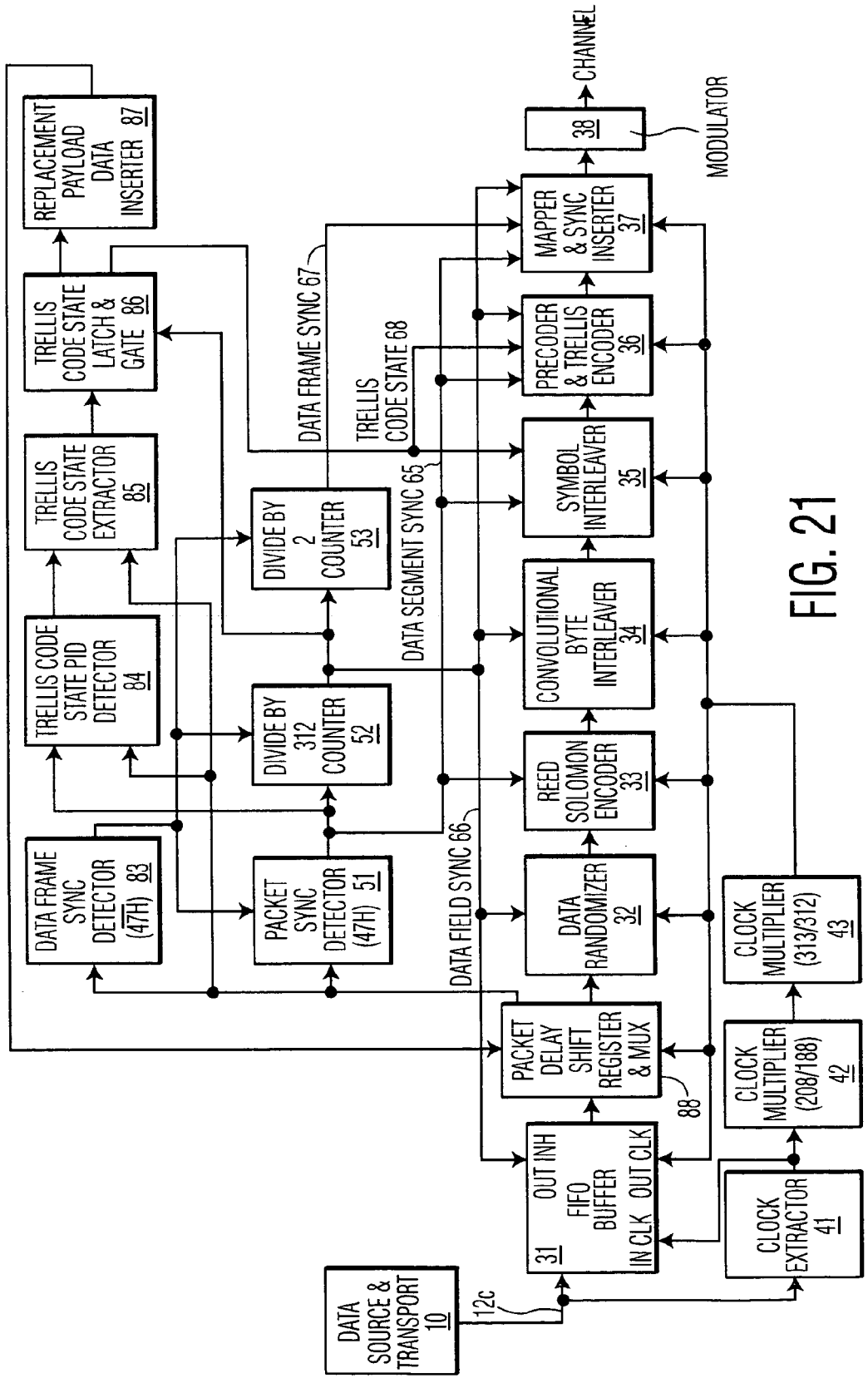
FIG. 21 is a block diagram of an 8-VSB channel encoder for a DTV modulator wherein the trellis code state packet is delivered to the channel encoder asynchronously relative to the data frame sync indicator.

The bottom three rows of functions in FIG. 21 are nearly the same as those in FIG. 11. The only difference in those three rows is that Partial Packet Delay Shift Register 81 of FIG. 11 is replaced with Packet Delay Shift Register & Multiplexer 88 in FIG. 21. The major differences between the two devices are the length of the delays—partial vs. a full packet—and the ability of the Packet Delay Shift Register & Multiplexer 88 to write into its shift register as well as reading out from it, as could the Partial Packet Delay Shift Register 81 of FIG. 11. While the block 88 in FIG. 21 is shown as having a full packet of delay, the same results of writing a full packet's worth of data into the stream as it passes through the shift register could also be achieved with shorter delays and the writing of successive portions of the packet, timed appropriately.

The other differences between the Transmitter Synchronization Inserter of FIG. 11 and that of FIG. 21 are contained in the top row of blocks. In both FIGS. 11 and 21, the Data Frame Sync Detector 83 maintains the Data Segment Sync 65 by setting the Packet Sync Detector 51 and sets the timing of the Data Frame Sync 67 cadence by resetting the Counters 52 and 53. Whereas, in FIG. 11, the Data Frame Sync Detector 83 also triggers the Trellis Code State PID Detector 84 to look for the Trellis Code State Packet immediately following the arrival of the Data Frame Sync word, in FIG. 21, the Trellis Code State PID Detector 84 is triggered by the Packet Sync Detector 51 so that it will check every packet for the Trellis Code State PID. Once the Trellis Code State Packet is located in the Packet Delay Shift Register & Multiplexer 88, as identified by its PID value, the Trellis Code State data is copied from the Packet Delay Shift Register 88 by the Trellis Code State Extractor 85 into the Trellis Code State Latch & Gate 86. The Trellis Code Latch & Gate 86, in turn, triggers the Replacement Payload Data Inserter 87 to replace the payload data of the Trellis Code State Packet in the Packet Delay Shift Register & Multiplexer 88 with the known value that was first inserted into the MPEG-2 Transport Stream by the Service Multiplexer 11 of FIG. 4. In this way, the data in the packet processed by the Data Processing subsystem at the transmitters is the same as the data that was processed by the Data Processing Model 14 in the Data Source 10 of FIG. 4. At the next Data Field Synchronization data segment, as indicated by Data Field Sync 66, any current Trellis Code State data latched in the Trellis Code State Latch & Gate 86 is used to set the states of the Pre-coder and Trellis Encoder 36 through the Symbol Interleaver 35 as described previously. The end result is that the Data Processing subsystems 23 at the RF Transmission Systems 20 in FIG. 4 will be synchronized to the Data Processing Model 14 at the Data Source 10 and will remain in synchronization until an error occurs somewhere in the overall system. At the time of such an error, the system we be fully re-synchronized at the next appearance of a Trellis Code State Packet in the MPEG-2 Transport Stream.

It should be noted that, while not explicitly shown, the preprocessing method of FIG. 5 can be applied to the transmitter synchronization method, in each of its alternative configurations, just as to the other methods. Similarly, it is possible to adjust the timing of the transmitters using appropriate delay functions in the signal path. Instructions could be sent to the transmitters in the form of coded data to control the time at which signals are emitted. Because of the inclusion of the Trellis Code State Packet in the MPEG-2 Transport Streams transported to the transmitter locations, only part of which packet is occupied by Trellis Code State data, there is an inherent method for such communication in the synchronized transmitter method. Similarly, measurement of the time of emission may be easier than with the other methods since the data stream features to be measured are implicit in the functioning of the various processing stages.

A further extension to the synchronized transmitter method, in each of its alternative configurations, is the transmission by any or all of the transmitters of certain sequences of bits and/or the resulting symbols that differ from those transmitted by the other transmitters in the single frequency network. The differing bits and/or symbols can allow identification of individual transmitters in the network and/or the transmission by them of a proportion of the transmitted data that differs from one transmitter to another. The bits and/or symbols that are varied from one transmitter to the next in this way must be carefully chosen so as not to disturb the ability of receivers to treat the signal from one transmitter as primary and those from the other transmitters in the network as echoes or whatever other methods receivers may use to enable reception of signals in a multipath environment. As with transmitter timing information just discussed, a means must be provided for communicating to the individual transmitters the differences in the data they are to transmit, which could be anything from a fixed setting of the transmitters to use of the additional capacity available in the Trellis Code State Packet, which comprises an inherent communications channel for transmitter control information.

There has thus been shown and described a novel digital signal transmitter synchronization system that fulfills all the objects and advantages sought therefor. Many changes, modifications, variations and other uses and applications of the subject invention will, however, become apparent to those of ordinary skill in the art after considering this specification and the accompanying drawings that disclose the preferred embodiments thereof. All such changes, modifications, variations and other uses and applications that do not depart from the spirit and scope of the invention are deemed to be covered by the invention, which is to be limited only by the claims that follow.

What is claimed is:

1. A method for synchronizing a plurality of digital RF transmitters that are supplied a common digital signal for RF modulation and subsequent transmission on a common channel throughout a prescribed region, whereby RF receivers within said region may receive transmissions on said channel from more than one transmitter, said method comprising the steps of:

generating a digital signal comprising informational data and formatting data;

inserting reference data into said digital signal;

transporting said digital signal with said reference data to said plurality of transmitters, each transmitter having channel coding, RF modulation and power amplification;

setting said channel coding of each transmitter at specific times into the same known states relative to said digital signal in response to receipt of said reference data;

at each transmitter, channel coding said resultant digital signal, modulating the resultant channel coded digital signal onto a channel carrier and power amplifying the resultant modulated signal after the states have been set; and transmitting the resultant amplified modulated signal at each transmitter, whereby the modulated signals transmitted by said plurality of transmitters will be substantially identical to one another, so that said receivers in said region will be able to properly recover the informational data when receiving signals from multiple transmitters.

2. The method defined in claim 1, further comprising the step of delaying the signal transmitted by at least one of said transmitters, such that identical signals received from at least two of said transmitters by at least one of said receivers in said region will arrive at said at least one receiver within a prescribed time window.

3. The method defined in claim 1, wherein said informational data includes audio and video data, whereby said digital signal forms a digital television (DTV) signal.

4. The method defined in claim 1, wherein the RF modulation includes eight-level vestigial sideband modulation (8-VSB).

5. The method defined in claim 4, wherein the RF modulation includes trellis coding (8T-VSB).

6. The method defined in claim 3, wherein the RF modulation includes eight-level vestigial sideband modulation (8-VSB).

7. The method defined in claim 6, wherein the RF modulation includes trellis coding (8T-VSB).

8. The method defined in claim 1, further comprising the step of preprocessing the digital signal, before transporting it to said plurality of transmitters, so as to improve the robustness of the amplified modulated signal transmitted by said transmitters.

9. The method defined in claim 8, wherein said preprocessing step includes the step of inserting supplementary data into said digital signal.

10. The method defined in claim 1, wherein certain sequences of data bits transmitted by each transmitter are unique with respect to corresponding sequences of data bits transmitted by the remaining ones of the plurality of transmitters, so as to enable identification of individual transmitters from their transmitted data or to enable delivery of different data by different ones of such transmitters.

11. A method for synchronizing a plurality of digital RF transmitters that are supplied a common digital signal for RF modulation and subsequent transmission on a common channel throughout a prescribed region, whereby the RF receivers within said region may receive transmissions on said channel from more than one transmitter, said method comprising the steps of:

generating a digital signal comprising informational data and formatting data;

processing the digital signal to insert reference data therein;

modulating the resultant digital signal onto a carrier at an intermediate frequency;

transporting the modulated digital signal to a plurality of transmitters, each transmitter having channel coding, RF modulation and power amplification;

demodulating the digital signal from the intermediate frequency at each transmitter;

at each transmitter, processing the demodulated digital signal to obtain a data stream to be transmitted and reference data necessary to synchronize further signal processing in the transmitter;

setting the channel coding of each transmitter at specific times into the same known states relative to the digital signal in response to reception of the reference data;

at each transmitter, channel coding the data stream, modulating the resultant channel coded data stream onto a channel carrier and power amplifying the resultant modulated signal after the states have been set; and transmitting the resultant amplified modulated signal at each transmitter, whereby the modulated signals transmitted by said plurality of transmitters will be substantially identical to one another, so that said receivers in said region will be able to properly recover the informational data when receiving signals from multiple transmitters.

12. The method defined in claim 11, further comprising the step of delaying the signal transmitted by at least one of said transmitters, such that identical signals received from at least two of said transmitters by at least one of said receivers in said region will arrive at said at least one receiver within a prescribed time window.

13. The method defined in claim 11, wherein said informational data includes audio and video data, whereby said digital signal forms a digital television (DTV) signal.

14. The method defined in claim 11, wherein the RF modulation includes eight-level vestigial sideband modulation (8-VSB).

15. The method defined in claim 14, wherein the RF modulation includes trellis coding (8T-VSB).

16. The method defined in claim 13, wherein the RF modulation includes eight-level vestigial sideband modulation (8-VSB).

17. The method defined in claim 16, wherein the RF modulation includes trellis coding (8T-VSB).

18. The method defined in claim 11, further comprising the step of preprocessing the digital signal, before transporting it to said plurality of transmitters, so as to improve the robustness of the amplified modulated signal transmitted by said transmitters.

19. The method defined in claim 18, wherein said preprocessing step includes the step of inserting supplementary data into said digital signal.

20. The method defined in claim 11, wherein certain sequences of data bits transmitted by each transmitter are unique with respect to corresponding sequences of data bits transmitted by the remaining ones of the plurality of transmitters, so as to enable identification of individual transmitters from their transmitted data or to enable delivery of different data by different ones of such transmitters.

21. A method for synchronizing a plurality of digital RF transmitters that are supplied a common digital signal for RF modulation and subsequent transmission on a common channel throughout a prescribed region, whereby RF receivers within said region may receive transmissions on said channel from more than one transmitter, said method comprising the steps of:

generating a digital signal comprising informational data and formatting data;

processing the digital signal to determine output symbol data for subsequent processing;

transporting the data-processed digital signal to a plurality of transmitters, each transmitter having signal processing, RF modulation and power amplification;

at each transmitter, signal processing the data processed digital signal, modulating the resultant signal processed signal onto a channel carrier and power amplifying the resultant modulated signal; and transmitting the resultant amplified modulated signal at each transmitter, whereby the modulated signals transmitted by said plurality of transmitters will be substantially identical to one another, so that said receivers in said region will be able to properly recover the informational data when receiving signals from multiple transmitters.

22. The method defined in claim 21, further comprising the step of delaying the signal transmitted by at least one of said transmitters, such that identical signals received from at least two of said transmitters by at least one of said receivers in said region will arrive at said at least one receiver within a prescribed time window.

23. The method defined in claim 21, wherein said informational data includes audio and video data, whereby said digital signal forms a digital television (DTV) signal.

24. The method defined in claim 21, wherein the RF modulation includes eight-level vestigial sideband modulation (8-VSB).

25. The method defined in claim 24, wherein the RF modulation includes trellis coding (8T-VSB).

26. The method defined in claim 23, wherein the RF modulation includes eight-level vestigial sideband modulation (8-VSB).

27. The method defined in claim 26, wherein the RF modulation includes trellis coding (8T-VSB).

28. The method defined in claim 21, further comprising the step of preprocessing the digital signal, before transporting it to said plurality of transmitters, so as to improve the robustness of the amplified modulated signal transmitted by said transmitters.

29. The method defined in claim 28, wherein said preprocessing step includes the step of inserting supplementary data into said digital signal.

30. The method defined in claim 21, wherein certain sequences of data bits transmitted by each transmitter are unique with respect to corresponding sequences of data bits transmitted by the remaining ones of the plurality of transmitters, so as to enable identification of individual transmitters from their transmitted data or to enable delivery of different data by different ones of such transmitters.

31. A method for synchronizing a plurality of digital RF transmitters that are supplied a common digital signal for RF modulation and subsequent transmission on a common channel throughout a prescribed region, whereby RF receivers within said region may receive transmissions on said channel from more than one transmitter, said method comprising the steps of:

generating a digital signal comprising informational data and formatting data;

processing the digital signal to determine output symbol data for channel coding;

extracting from the processed digital signal reference data to be used in synchronizing the plurality of transmitters;

inserting the reference data into the unprocessed digital signal;

transporting the unprocessed digital signal with the reference data to the plurality of transmitters, each transmitter having channel coding, RF modulation and power amplification;

setting the channel coding of each transmitter at specific times into the same known states relative to the digital signal in response to reception of the reference data;

at each transmitter, channel coding the unprocessed digital signal, modulating the resultant channel coded signal onto a channel carrier and power amplifying the resultant modulated signal after the states have been set; and transmitting the resultant amplified modulated signal at each transmitter, whereby the modulated signals transmitted by said plurality of transmitters will be substantially identical to one another, so that said receivers in said region will be able to properly recover the informational data when receiving signals from multiple transmitters.

32. The method defined in claim 31, further comprising the step of delaying the signal transmitted by at least one of said transmitters, such that identical signals received from at least two of said transmitters by at least one of said receivers in said region will arrive at said at least one receiver within a prescribed time window.

33. The method defined in claim 31, wherein said informational data includes audio and video data, whereby said digital signal forms a digital television (DTV) signal.

34. The method defined in claim 31, wherein the RF modulation includes eight-level vestigial sideband modulation (8-VSB).

35. The method defined in claim 34, wherein the RF modulation includes trellis coding (8T-VSB).

36. The method defined in claim 33, wherein the RF modulation includes eight-level vestigial sideband modulation (8-VSB).

37. The method defined in claim 36, wherein the RF modulation includes trellis coding (8T-VSB).

38. The method defined in claim 31, further comprising the step of preprocessing the digital signal, before transporting it to said plurality of transmitters, so as to improve the robustness of the amplified modulated signal transmitted by said transmitters.

39. The method defined in claim 38, wherein said preprocessing step includes the step of inserting supplementary data into said digital signal.

40. The method defined in claim 31, wherein certain sequences of data bits transmitted by each transmitter are unique with respect to corresponding sequences of data bits transmitted by the remaining ones of the plurality of transmitters, so as to enable identification of individual transmitters from their transmitted data or to enable delivery of different data by different ones of such transmitters.

41. A method for synchronizing a digital RF transmitter that is supplied a digital signal for RF modulation and subsequent transmission throughout a prescribed region, said method comprising the steps of:
  generating a digital signal comprising informational data and formatting data;
  inserting reference data into said digital signal;
  transporting said digital signal with said reference data to said transmitter, said transmitter having channel coding, RF modulation and power amplification;
  setting said channel coding of said transmitter at specific times into known states relative to said digital signal in response to receipt of said reference data;
  at said transmitter, channel coding said digital signal, modulating the resultant channel coded digital signal onto a channel carrier and power amplifying the resultant modulated signal after the states have been set; and
  transmitting the resultant amplified modulated signal at said transmitter.

42. The method defined in claim 41, further comprising the step of preprocessing the digital signal, before transporting it to said transmitter, so as to improve the robustness of the amplified modulated signal transmitted by said transmitter.

43. The method defined in claim 42, wherein said preprocessing step includes the step of inserting supplementary data into said digital signal.

* * * * *